United States Patent
Azuma et al.

(10) Patent No.: US 10,273,331 B2
(45) Date of Patent: *Apr. 30, 2019

(54) POLYARYLATE RESIN AND ELECTROPHOTOGRAPHIC PHOTOSENSITIVE MEMBER

(71) Applicant: KYOCERA Document Solutions Inc., Osaka (JP)

(72) Inventors: Jun Azuma, Osaka (JP); Kenji Kitaguchi, Osaka (JP); Kensuke Okawa, Osaka (JP); Seiki Hasunuma, Osaka (JP); Tomofumi Shimizu, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/824,745

(22) Filed: Nov. 28, 2017

(65) Prior Publication Data
US 2018/0148538 A1    May 31, 2018

(30) Foreign Application Priority Data
Nov. 30, 2016    (JP) .................................. 2016-232073

(51) Int. Cl.
*G03G 5/05*     (2006.01)
*G03G 5/06*     (2006.01)
(Continued)

(52) U.S. Cl.
CPC ........... *C08G 63/19* (2013.01); *C08G 63/181* (2013.01); *C08L 67/025* (2013.01); *G03G 5/056* (2013.01);
(Continued)

(58) Field of Classification Search
CPC .... C08G 63/19; C08G 63/181; G03G 5/0672; G03G 5/056; G03G 5/0567; G03G 5/0614; C08L 67/025; C08L 2203/16
See application file for complete search history.

(56) References Cited

U.S. PATENT DOCUMENTS

2013/0209929 A1* 8/2013 Fujii ..................... G03G 5/047
430/56

FOREIGN PATENT DOCUMENTS

JP       H08-110646 A       4/1996

* cited by examiner

*Primary Examiner* — Thorl Chea
(74) *Attorney, Agent, or Firm* — Studebaker & Brackett PC

(57) ABSTRACT

A polyarylate resin is represented by general formula (1) shown below. In general formula (1), $R^1$ and $R^2$ each represent, independently of one another, a hydrogen atom or a methyl group. r and s each represent an integer of at least 0 and no greater than 49. t and u each represent an integer of at least 1 and no greater than 50. $r+s+t+u=100$. $r+t=s+u$. X and Y each represent, independently of one another, a divalent group represented by chemical formula (1-1), chemical formula (1-2), chemical formula (1-3), or chemical formula (1-4). X and Y are different from one another.

(Continued)

[Formula 1]
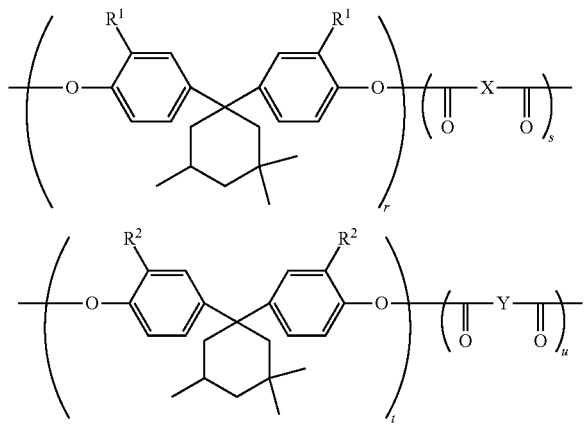
[Formula 2]
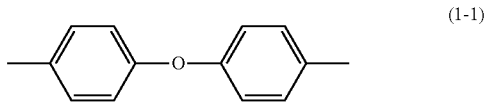
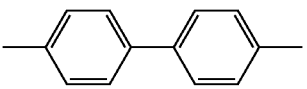
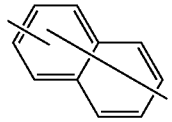
2 Claims, 3 Drawing Sheets
(51) Int. Cl.
  *C08G 63/19* (2006.01)
  *C08G 63/181* (2006.01)
  *C08L 67/02* (2006.01)
(52) U.S. Cl.
  CPC ......... *G03G 5/0567* (2013.01); *G03G 5/0614* (2013.01); *G03G 5/0672* (2013.01); *C08L 2203/16* (2013.01)

POLYARYLATE RESIN AND ELECTROPHOTOGRAPHIC PHOTOSENSITIVE MEMBER

INCORPORATION BY REFERENCE

The present application claims priority under 35 U.S.C. § 119 to Japanese Patent Application No. 2016-232073, filed on Nov. 30, 2016. The contents of this application are incorporated herein by reference in their entirety.

BACKGROUND

The present disclosure relates to a polyarylate resin and an electrophotographic photosensitive member.

Electrophotographic photosensitive members are used as image bearing members of electrophotographic image forming apparatuses (for example, printers or multifunction peripherals). The electrophotographic photosensitive members each include a photosensitive layer. The electrophotographic photosensitive members used in electrophotographic image forming apparatuses for example include single-layer electrophotographic photosensitive members and multi-layer electrophotographic photosensitive members. The single-layer electrophotographic photosensitive members each include a photosensitive layer having a charge generation function and a charge transport function. The multi-layer electrophotographic photosensitive members each include, as a photosensitive layer, a charge generating layer having a charge generation function and a charge transport layer having a charge transport function.

A known polyarylate resin has a repeating unit represented by chemical formula (Resin-7) shown below. Furthermore, a known electrophotographic photosensitive member contains the polyarylate resin.

[Formula 1]

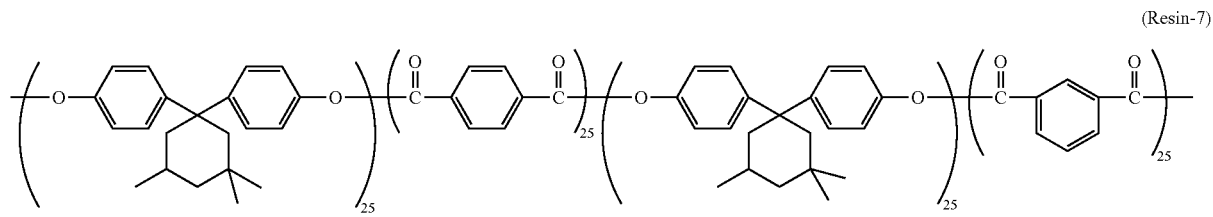

(Resin-7)

SUMMARY

A polyarylate resin according to an aspect of the present disclosure is represented by general formula (1) shown below.

[Formula 2]

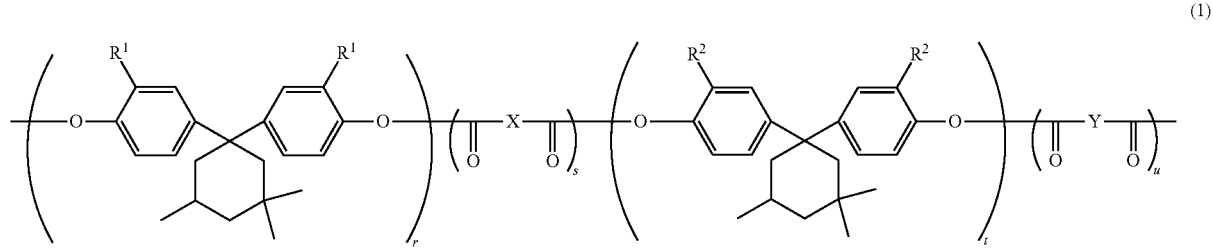

(1)

In general formula (1), $R^1$ and $R^2$ each represent, independently of one another, a hydrogen atom or a methyl group. r and s each represent an integer of at least 0 and no greater than 49. t and u each represent an integer of at least 1 and no greater than 50. r+s+t+u=100. r+t=s+u. X and Y each represent, independently of one another, a divalent group represented by chemical formula (1-1), chemical formula (1-2), chemical formula (1-3), or chemical formula (1-4). X and Y are different from one another.

[Formula 3]

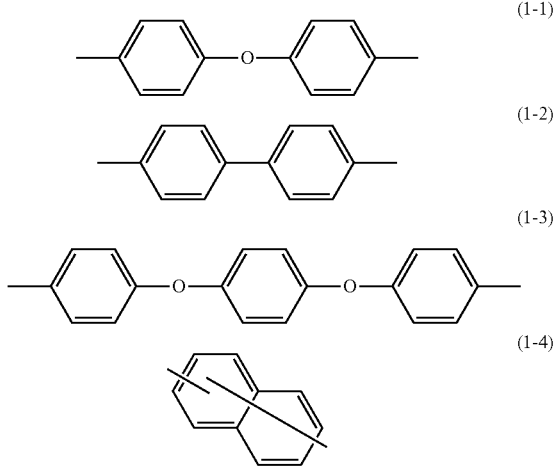

(1-1)

(1-2)

(1-3)

(1-4)

An electrophotographic photosensitive member according to another aspect of the present disclosure includes a conductive substrate and a photosensitive layer. The photosensitive layer contains a charge generating material, a hole transport material, and a binder resin. The binder resin includes the above-described polyarylate resin.

DETAILED DESCRIPTION

Figure 1A:
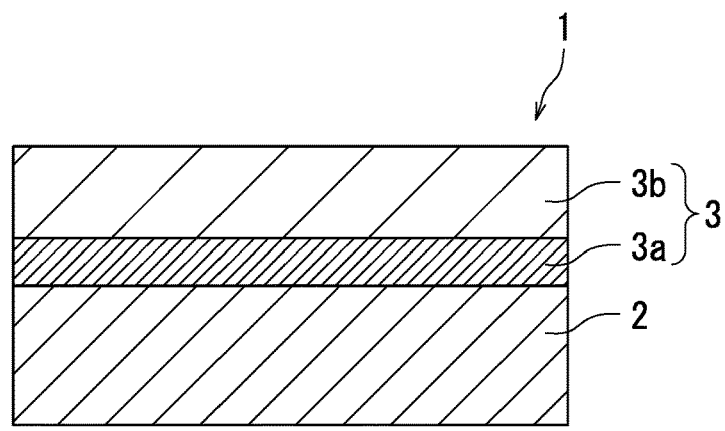
FIG. 1A is a schematic cross-sectional view illustrating an example of a structure of an electrophotographic photosensitive member according to a second embodiment of the present disclosure.

The following describes embodiments of the present disclosure. However, the present disclosure is not in any way limited by the following embodiments and appropriate changes may be made when practicing the present disclosure so long as such changes do not deviate from the intended scope of the present disclosure. Although description is omitted as appropriate in some instances in order to avoid repetition, such omission does not limit the essence of the present disclosure. Hereinafter, the term "-based" may be appended to the name of a chemical compound in order to form a generic name encompassing both the chemical compound itself and derivatives thereof. Also, when the term "-based" is appended to the name of a chemical compound used in the name of a polymer, the term indicates that a repeating unit of the polymer originates from the chemical compound or a derivative thereof.

Hereinafter, an alkyl group having a carbon number of at least 1 and no greater than 8, an alkyl group having a carbon number of at least 1 and no greater than 6, an alkyl group having a carbon number of at least 1 and no greater than 4, an alkoxy group having a carbon number of at least 1 and no greater than 8, an alkoxy group having a carbon number of at least 1 and no greater than 4, and a cycloalkane having a carbon number of at least 5 and no greater than 7 each refer to the following.

An alkyl group having a carbon number of at least 1 and no greater than 8 as used herein refers to an unsubstituted straight chain or branched chain alkyl group. Examples of the alkyl group having a carbon number of at least 1 and no greater than 8 include a methyl group, an ethyl group, a propyl group, an isopropyl group, an n-butyl group, an s-butyl group, a t-butyl group, a pentyl group, an isopentyl group, a neopentyl group, a hexyl group, a heptyl group, and an octyl group.

An alkyl group having a carbon number of at least 1 and no greater than 6 as used herein refers to an unsubstituted straight chain or branched chain alkyl group. Examples of the alkyl group having a carbon number of at least 1 and no greater than 6 include a methyl group, an ethyl group, a propyl group, an isopropyl group, an n-butyl group, an s-butyl group, a t-butyl group, a pentyl group, an isopentyl group, a neopentyl group, and a hexyl group.

An alkyl group having a carbon number of at least 1 and no greater than 4 as used herein refers to an unsubstituted straight chain or branched chain alkyl group. Examples of the alkyl group having a carbon number of at least 1 and no greater than 4 include a methyl group, an ethyl group, a propyl group, an isopropyl group, an n-butyl group, an s-butyl group, and a t-butyl group.

An alkoxy group having a carbon number of at least 1 and no greater than 8 as used herein refers to an unsubstituted straight chain or branched chain alkoxy group. Examples of the alkoxy group having a carbon number of at least 1 and no greater than 8 include a methoxy group, an ethoxy group, an n-propoxy group, an isopropoxy group, an n-butoxy group, an s-butoxy group, a t-butoxy group, a pentyloxy group, an isopentyloxy group, a neopentyloxy group, a hexyloxy group, a heptyloxy group, and an octyloxy group.

An alkoxy group having a carbon number of at least 1 and no greater than 4 as used herein refers to an unsubstituted straight chain or branched chain alkyl group. Examples of the alkoxy group having a carbon number of at least 1 and no greater than 4 include a methoxy group, an ethoxy group, an n-propoxy group, an isopropoxy group, an n-butoxy group, an s-butoxy group, and a t-butoxy group.

A cycloalkane having a carbon number of at least 5 and no greater than 7 as used herein refers to an unsubstituted cycloalkane. Examples of the cycloalkane having a carbon number of at least 5 and no greater than 7 include cyclopentane, cyclohexane, and cycloheptane.

First Embodiment: Polyarylate Resin

A polyarylate resin according to a first embodiment of the present disclosure is represented by general formula (1) shown below. Hereinafter, the polyarylate resin represented by general formula (1) may be referred to as a polyarylate resin (1).

[Formula 4]

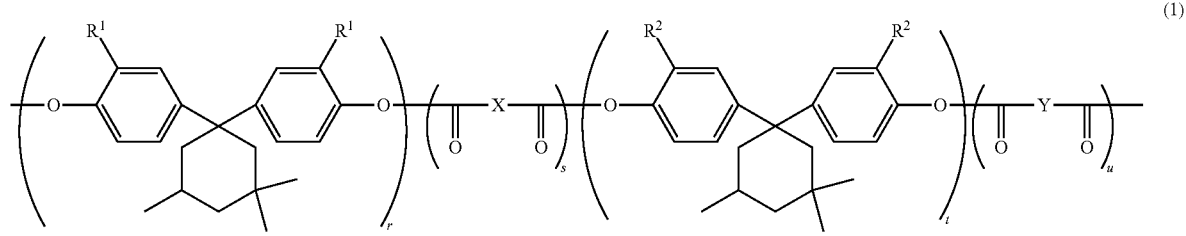

(1)

In general formula (1), $R^1$ and $R^2$ each represent, independently of one another, a hydrogen atom or a methyl group. r and s each represent an integer of at least 0 and no greater than 49. t and u each represent an integer of at least 1 and no greater than 50. r+s+t+u=100. r+t=s+u. X and Y each represent, independently of one another, a divalent group represented by chemical formula (1-1), (1-2), (1-3), or (1-4). X and Y are different from one another.

[Formula 5]

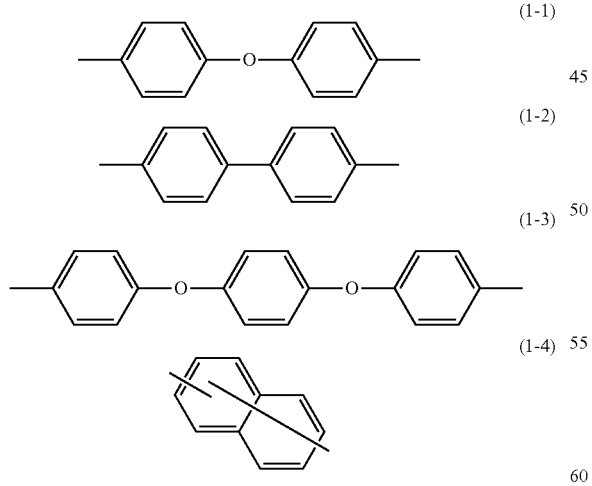

In terms of further improving abrasion resistance of a photosensitive member containing the polyarylate resin (1), the polyarylate resin (1) preferably has a divalent group represented by chemical formula (1-4). More specifically, when s represents 0 in general formula (1), Y preferably represents a divalent group represented by chemical formula (1-4). When s represents an integer of at least 1, Y or Y preferably represents a divalent group represented by chemical formula (1-4).

When r represents an integer of at least 1 in general formula (1), one of $R^1$ and $R^2$ may represent a hydrogen atom, and the other of $R^1$ and $R^2$ may represent a methyl group.

The polyarylate resin (1) has a repeating unit having a mole fraction of r/(r+t) and represented by chemical formula (1-5), a repeating unit having a mole fraction of s/(s+u) and represented by chemical formula (1-6), a repeating unit having a mole fraction of t/(r+t) and represented by general formula (1-7), and a repeating unit having a mole fraction of u/(s+u) and represented by general formula (1-8). Hereinafter, these repeating units may be respectively referred to as repeating units (1-5), (1-6), (1-7), and (1-8).

[Formula 6]

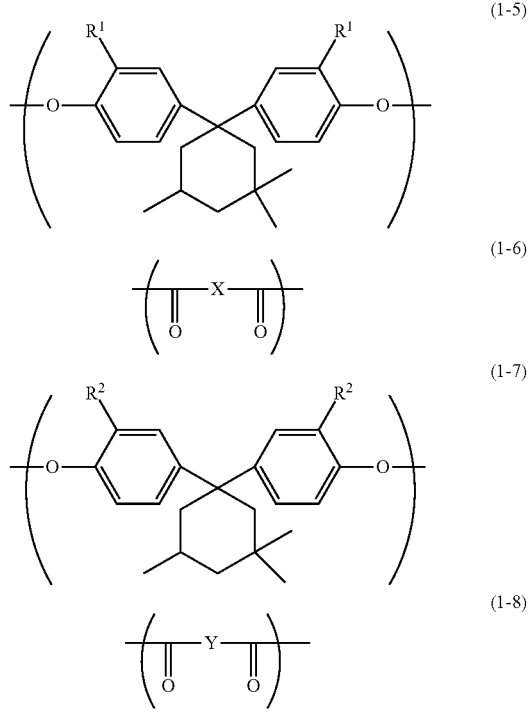

In general formula (1-5), general formula (1-6), general formula (1-7), and general formula (1-8), $R^1$ and $R^2$ each represent, independently of one another, a hydrogen atom or a methyl group. X and Y each represent, independently of one another, a divalent group represented by chemical formula (1-1), chemical formula (1-2), chemical formula (1-3), or chemical formula (1-4). X and Y are different from one another.

The polyarylate resin (1) does not need to have any other repeating units than the above-mentioned four repeating units when r and s each represent an integer of at least 1. The polyarylate resin (1) may have a repeating unit other than the repeating units (1-5) to (1-8). A ratio of a sum of amounts by mole (mole fraction) of the repeating units (1-5) to (1-8) to the total amount by mole of all the repeating units in the polyarylate resin (1) is preferably at least 0.80, more preferably at least 0.90, and still more preferably 1.00.

No particular limitations are placed on the sequence of the repeating units (1-5) to (1-8) in the polyarylate resin (1) so long as a repeating unit derived from an aromatic diol and a repeating unit derived from an aromatic dicarboxylic acid are adjacent to one another. For example, the repeating unit (1-5) is adjacent to and bonded to the repeating unit (1-6) or the repeating unit (1-8). Likewise, the repeating unit (1-7) is adjacent to and bonded to the repeating unit (1-6) or the repeating unit (1-8). The polyarylate resin (1) may have a repeating unit other than the repeating units (1-5) to (1-8).

r and t in general formula (1) each represent an integer of at least 0 and no greater than 49. s and u each represent an integer of at least 1 and no greater than 50. r+s+t+u=100. r+t=s+u. Preferably, s/(s+u) is at least 0.30 and no greater than 0.70. s/(s+u) represents a ratio of the amount by mole (mole fraction) of the repeating unit (1-6) to a sum of amounts by mole of the repeating unit (1-6) and the repeating unit (1-8) in the polyarylate resin (1).

Examples of the polyarylate resin (1) include polyarylate resins represented by chemical formulae (Resin-1) to (Resin-10) (also referred to below as polyarylate resins (Resin-1) to (Resin-10)).

[Formula 7]

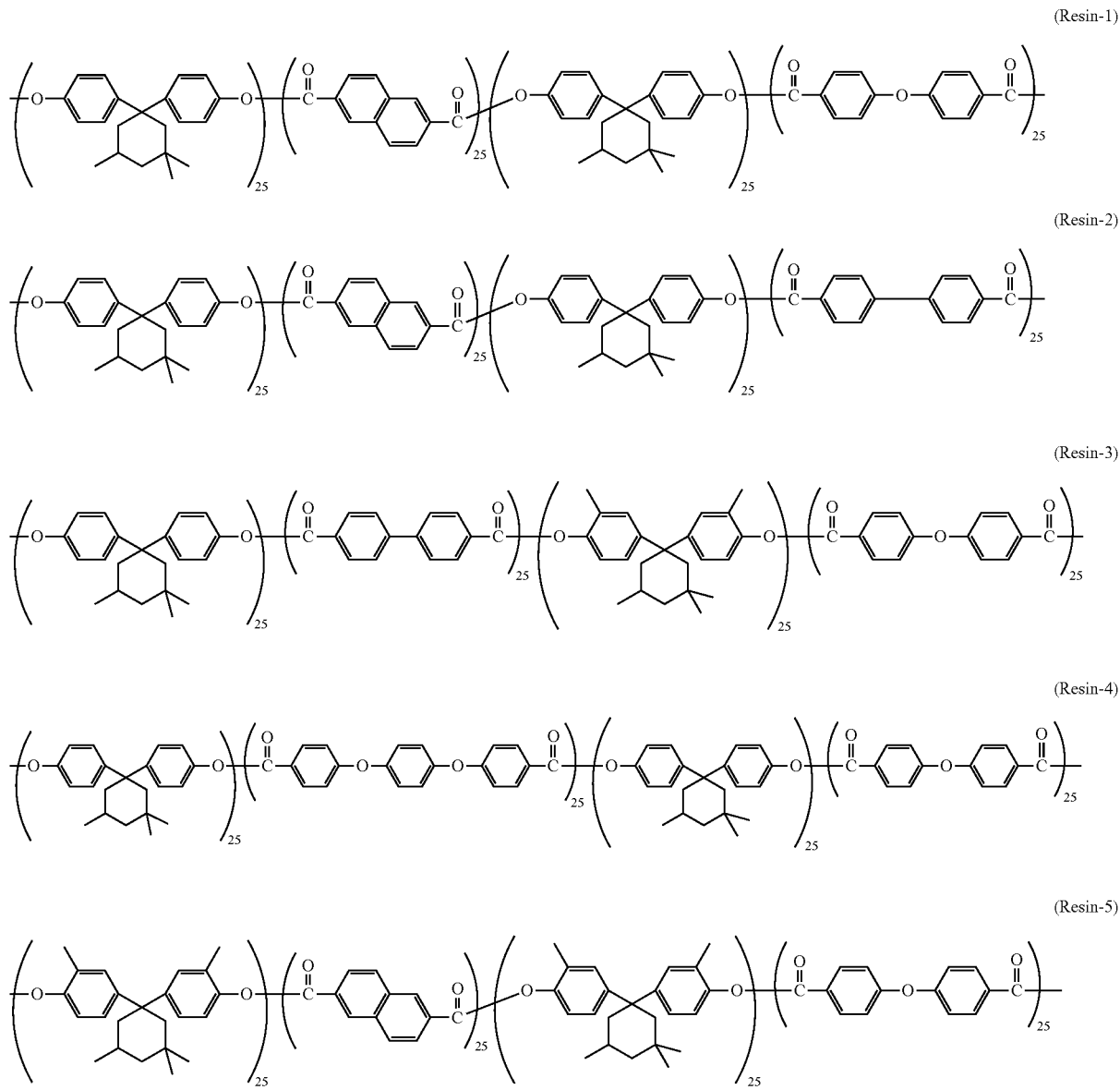

[Formula 8]

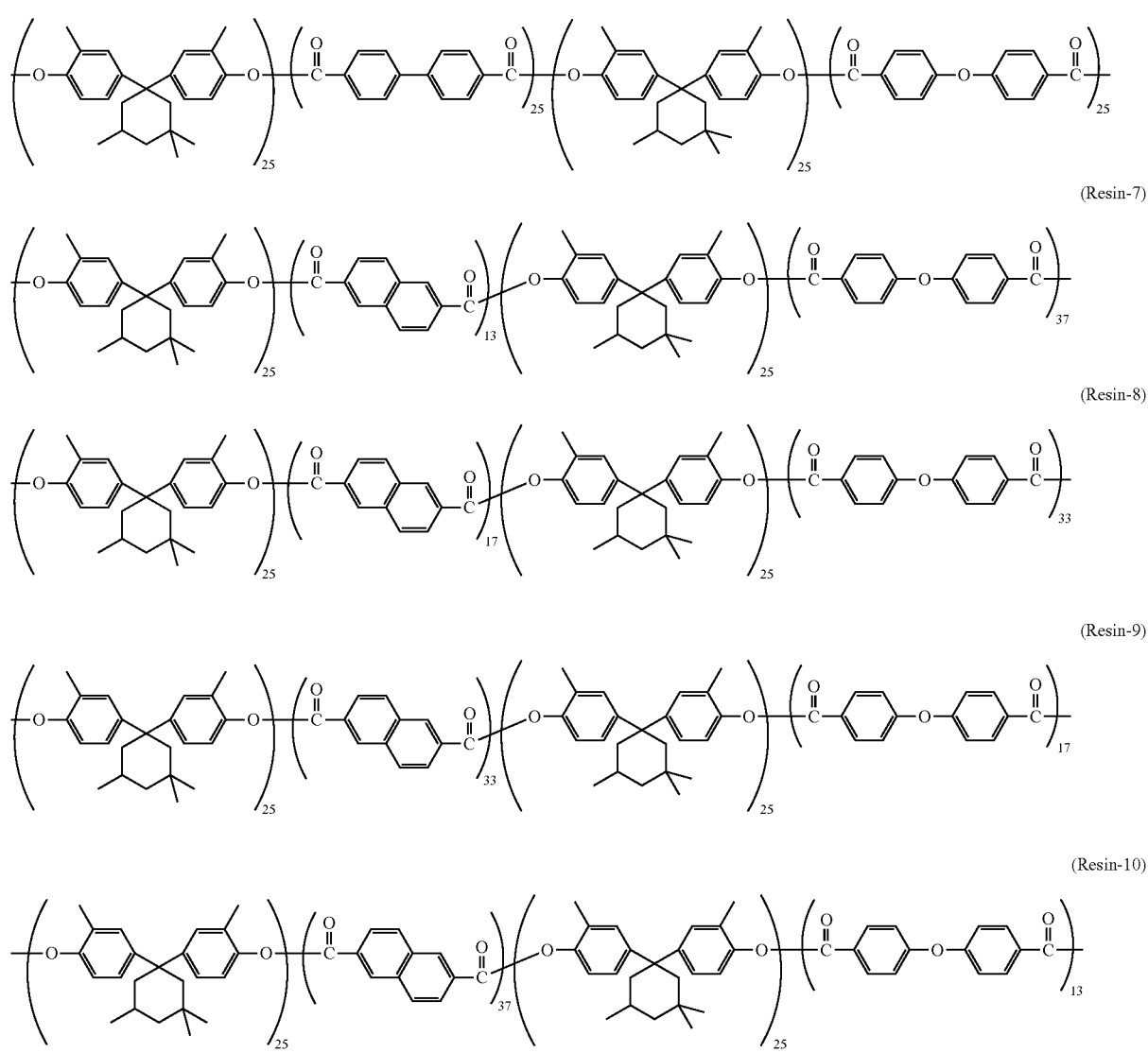

In terms of the abrasion resistance, the polyarylate resin (1) preferably has a viscosity average molecular weight of at least 10,000, more preferably greater than 20,000, still more preferably greater than 30,000, and particularly preferably greater than 45,000. In a situation in which the polyarylate resin (1) having a viscosity average molecular weight of at least 10,000 is contained in a photosensitive member as a binder resin, the binder resin has improved abrasion resistance, and a charge transport layer of the photosensitive member is resistant to abrasion. At the same time, the polyarylate resin (1) preferably has a viscosity average molecular weight of no greater than 80,000 and more preferably no greater than 54,000. As a result of the polyarylate resin (1) having a viscosity average molecular weight of no greater than 80,000, the polyarylate resin (1) is easily dissolved in a solvent during formation of the charge transport layer, and therefore formation of the charge transport layer tends to be easy.

(Production Method of Polyarylate Resin (1))

No particular limitations are placed on the method for producing the polyarylate resin (1) so long as the method enables production of the polyarylate resin (1). Examples of production methods that can be employed include a method involving polycondensation of an aromatic dicarboxylic acid and an aromatic diol for forming repeating units of the polyarylate resin (1). The polyarylate resin (1) may be synthesized according to a known synthesis method (specific examples include solution polymerization, melt polymerization, and interfacial polymerization). The following describes an example of the production method of the polyarylate resin (1).

The polyarylate resin (1) is produced through a reaction represented by reaction formula (R-1) shown below (also referred to below as a reaction (R-1)) or through a method conforming therewith. The production method of the polyarylate resin (1) for example includes the reaction (R-1).

[Formula 9]

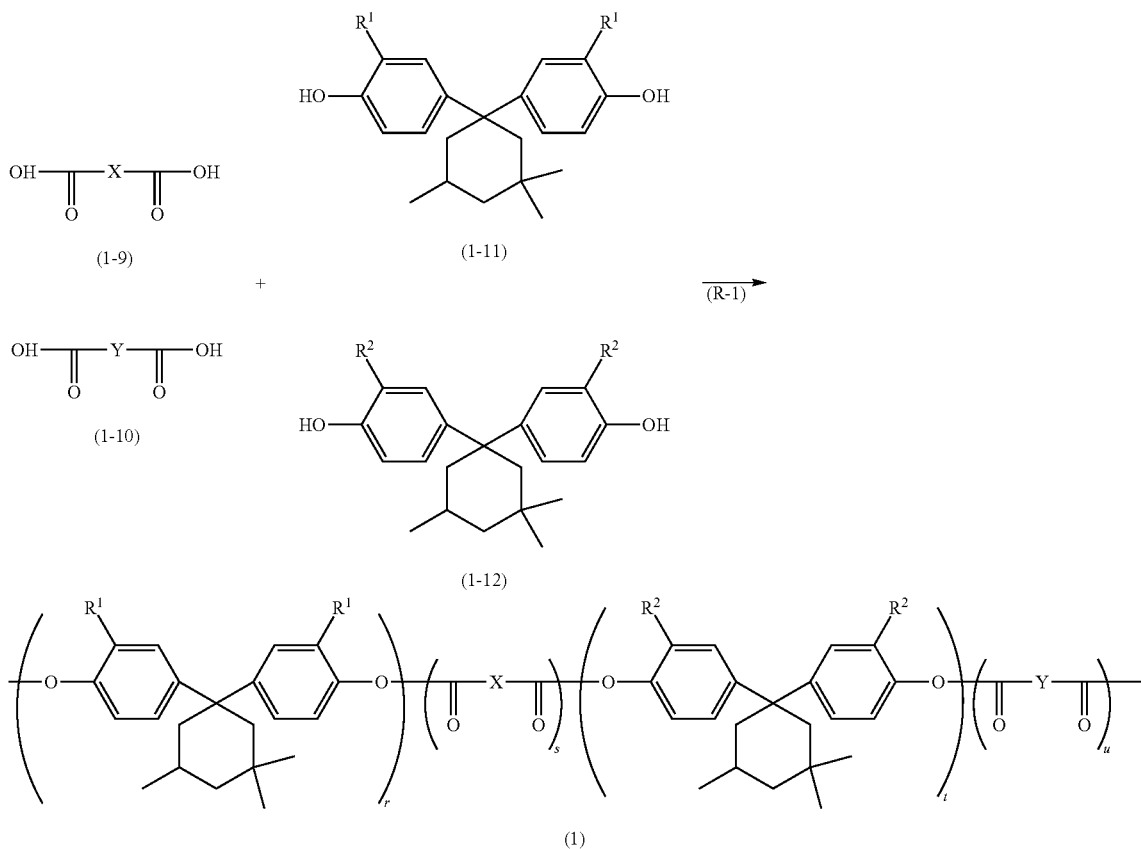

In the reaction (R-1), $R^1$ in general formula (1-11), $R^2$ in general formula (1-12), X in general formula (1-9), and Y in general formula (1-10) respectively represent the same as $R^1$, $R^2$, X, and Y in general formula (1).

In the reaction (R-1), an aromatic dicarboxylic acid represented by general formula (1-9) and an aromatic dicarboxylic acid represented by general formula (1-10) (also referred to below as an aromatic dicarboxylic acid (1-9) and an aromatic dicarboxylic acid (1-10), respectively) are caused to react with an aromatic diol represented by general formula (1-11) and an aromatic diol represented by general formula (1-12) (also referred to below as an aromatic diol (1-11) and an aromatic diol (1-12), respectively) to yield the polyarylate resin (1).

Examples of the aromatic dicarboxylic acids (1-9) and (1-10) include 4,4'-dicarboxydiphenyl ether, 4,4'-dicarboxybiphenyl, and 2,6-naphthalene dicarboxylic acid. In the reaction (R-1), an optional aromatic dicarboxylic acid may be used in addition to the aromatic dicarboxylic acids (1-9) and (1-10). Note that instead of the aromatic dicarboxylic acids, derivatives of the aromatic dicarboxylic acids may be used in the reaction (R-1). Examples of derivatives of the aromatic dicarboxylic acids that can be used include alkanoyl halides and acid anhydrides of the aromatic dicarboxylic acids (1-9) and (1-10).

Examples of the aromatic diols (1-11) and (1-12) include 1,1-bis(4-hydroxyphenyl)-3,3-dimethyl-5-methylcyclohexane and 1,1-bis(4-hydroxy-3-methylphenyl)-3,3-dimethyl-5-methylcyclohexane. In the reaction (R-1), an optional aromatic diol may be used in addition to the aromatic diols (1-11) and (1-12). Examples of optional aromatic diols that can be used include bisphenol A, bisphenol S, bisphenol E, and bisphenol F. Note that instead of the aromatic diols, derivatives of the aromatic diols may be used in the reaction (R-1). Examples of derivatives of the aromatic diols include diacetates thereof.

Preferably, the total amount by mole of the aromatic diols (1-11) and (1-12) relative to the total amount by mole of 1 mol of the aromatic dicarboxylic acids (1-9) and (1-10) is at least 0.9 mol and no greater than 1.1 mol. The above-specified range is preferable in terms of readily purifying the polyarylate resin (1) and increasing the percentage yield of the polyarylate resin (1).

The reaction (R-1) may be promoted in the presence of an alkali and a catalyst. Examples of catalysts that can be used include tertiary ammoniums (specific examples include trialkylamine) and quaternary ammonium salts (specific examples include benzyl trimethyl ammonium chloride). Examples of alkalis that can be used include alkali metal hydroxides (specific examples include sodium hydroxide and potassium hydroxide) and alkaline earth metal hydroxides (specific examples include calcium hydroxide). The reaction (R-1) may be promoted in a solvent or under an inert gas atmosphere. Examples of solvents that can be used include water and chloroform. Examples of inert gas that can be used include argon. The reaction time of the reaction (R-1) is preferably at least 2 hours and no greater than 5 hours. The reaction temperature is preferably at least 5° C. and no greater than 25° C.

The production of the polyarylate resin (1) may include other optional processes. Examples of the optional processes include a purification process. Examples of purification methods that can be employed include known methods (specific examples include filtration, chromatography, and crystallization).

Second Embodiment: Electrophotographic Photosensitive Member

An electrophotographic photosensitive member according to a second embodiment of the present disclosure (also referred to below simply as a photosensitive member) includes a conductive substrate and a photosensitive layer. The photosensitive member is for example a multi-layer electrophotographic photosensitive member (also referred to below as a multi-layer photosensitive member) or a single-layer electrophotographic photosensitive member (also referred to below as a single-layer photosensitive member).

Figure 1B:
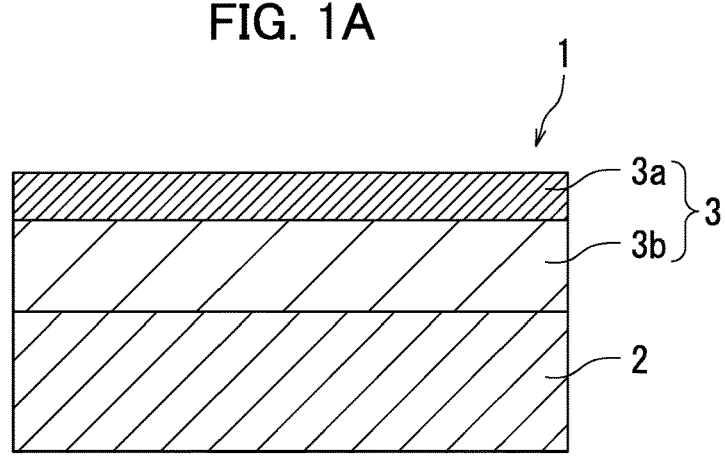
FIG. 1B is a schematic cross-sectional view illustrating an example of the structure of the electrophotographic photosensitive member according to the second embodiment of the present disclosure.
Figure 1C:
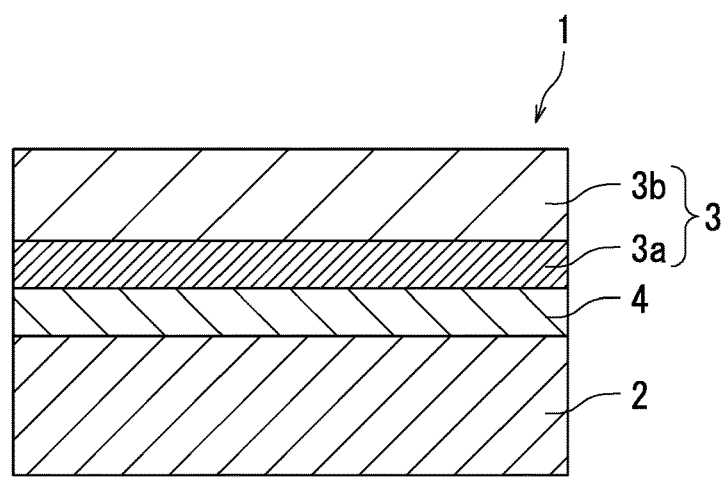
FIG. 1C is a schematic cross-sectional view illustrating an example of the structure of the electrophotographic photosensitive member according to the second embodiment of the present disclosure.

The photosensitive layer of the multi-layer photosensitive member includes a charge generating layer and a charge transport layer. The following describes a structure of a multi-layer photosensitive member 1 according to the second embodiment with reference to FIGS. 1A to 1C. FIGS. 1A to 1C are schematic cross-sectional views illustrating the structure of the multi-layer photosensitive member 1. As illustrated in FIG. 1A, the multi-layer photosensitive member 1 includes a conductive substrate 2 and a photosensitive layer 3. The photosensitive layer 3 includes a charge generating layer 3a and a charge transport layer 3b. As illustrated in FIG. 1A, the multi-layer photosensitive member 1 may have the charge generating layer 3a on the conductive substrate 2 and further have the charge transport layer 3b on the charge generating layer 3a. Alternatively, the multi-layer photosensitive member 1 may have the charge transport layer 3b on the conductive substrate 2 and further have the charge generating layer 3a on the charge transport layer 3b as illustrated in FIG. 1B. As illustrated in FIG. 1A, the charge transport layer 3b may be disposed as an outermost layer of the multi-layer photosensitive member 1. The charge transport layer 3b may be a one-layer (single-layer) charge transport layer.

The photosensitive layer 3 may be disposed directly on the conductive substrate 2 as illustrated in FIG. 1A. Alternatively, the multi-layer photosensitive member 1 for example includes the conductive substrate 2, an intermediate layer (under layer) 4, and the photosensitive layer 3 as illustrated in FIG. 1C. The photosensitive layer 3 may be disposed indirectly on the conductive substrate 2 as illustrated in FIG. 1C. The intermediate layer 4 may be disposed between the conductive substrate 2 and the charge generating layer 3a as illustrated in FIG. 1C. The intermediate layer 4 may for example be disposed between the charge generating layer 3a and the charge transport layer 3b. The charge generating layer 3a may be a single-layer charge generating layer or a multi-layer charge generating layer.

Figure 2A:
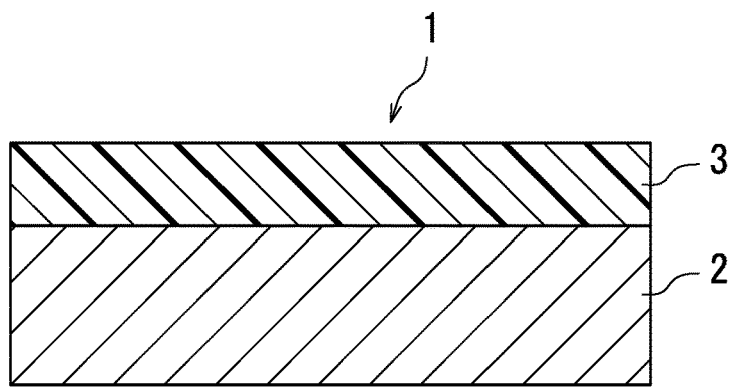
FIG. 2A is a schematic cross-sectional view illustrating another example of the structure of the electrophotographic photosensitive member according to the second embodiment of the present disclosure.
Figure 2B:
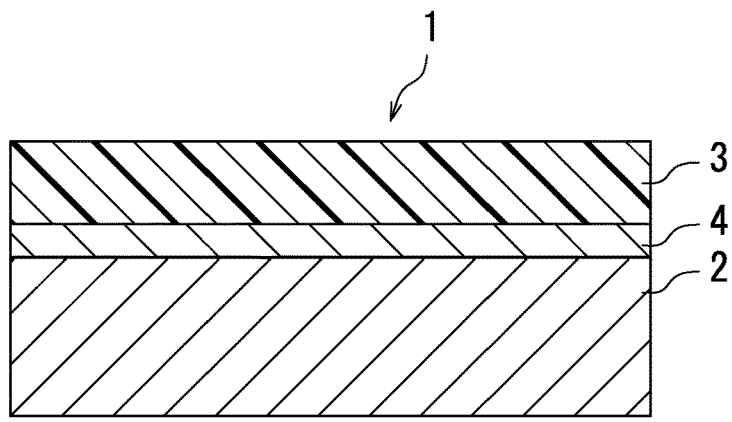
FIG. 2B is a schematic cross-sectional view illustrating another example of the structure of the electrophotographic photosensitive member according to the second embodiment of the present disclosure.
Figure 2C:
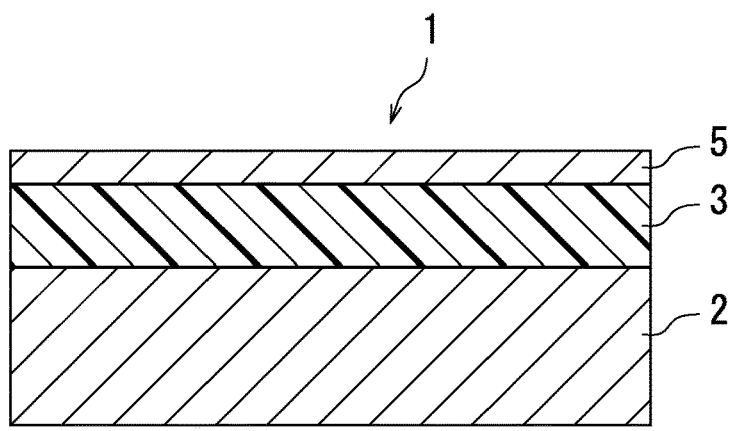
FIG. 2C is a schematic cross-sectional view illustrating another example of the structure of the electrophotographic photosensitive member according to the second embodiment of the present disclosure.

The following describes a structure of a single-layer photosensitive member 1 according to the second embodiment with reference to FIGS. 2A to 2C. FIGS. 2A to 2C are schematic cross-sectional views illustrating the structure of the single-layer photosensitive member 1. As illustrated in FIG. 2A, the single-layer photosensitive member 1 includes a conductive substrate 2 and a photosensitive layer 3. The photosensitive layer 3 is a one-layer photosensitive layer (single-layer photosensitive layer). The photosensitive layer 3 may be disposed directly on the conductive substrate 2 as illustrated in FIG. 2A. Alternatively, the single-layer photosensitive member 1 for example includes the conductive substrate 2, an intermediate layer (under layer) 4, and the photosensitive layer 3 as illustrated in FIG. 2B. The photosensitive layer 3 may be disposed indirectly on the conductive substrate 2 as illustrated in FIG. 2B. The intermediate layer 4 may be disposed between the conductive substrate 2 and the single-layer photosensitive layer as illustrated in FIG. 2B. As illustrated in FIG. 2C, a protective layer 5 may be disposed as an outermost layer of the single-layer photosensitive member 1.

The photosensitive member 1 according to the second embodiment has excellent abrasion resistance. The reason for the above is thought to be as follows. The photosensitive member 1 according to the second embodiment contains the polyarylate resin (1) as a binder resin. The polyarylate resin (1) has repeating units each derived from an aromatic diol having a 3,3-dimethyl-5-methylcyclohexylidene group and repeating units each derived from an aromatic dicarboxylic acid having a divalent group represented by one of general formulae (1-1) to (1-4). The degree of molecular chain entanglement of the polyarylate resin (1) having such a structure tends not to decrease, and thus the degree of molecular packing thereof tends not to decrease. Furthermore, the polyarylate resin (1) having such a structure is highly soluble in a solvent. Accordingly, an application liquid for formation of the photosensitive layer 3 is readily prepared. Consequently, the resulting photosensitive layer 3 tends to have increased layer density. Thus, the photosensitive member 1 according to the second embodiment has excellent abrasion resistance.

The following describes elements (the conductive substrate 2, the photosensitive layer 3, and the intermediate layer 4) of the photosensitive member 1 according to the second embodiment. The following further describes a method for producing the photosensitive member 1.

[1. Conductive Substrate]

No particular limitations are placed on the conductive substrate 2 other than being a conductive substrate that can be used in the photosensitive member 1. At least a surface portion of the conductive substrate 2 may be formed from a conductive material. For example, the conductive substrate is formed from a conductive material. For another example, the conductive substrate has a coat of a conductive material. Examples of conductive materials that can be used include aluminum, iron, copper, tin, platinum, silver, vanadium, molybdenum, chromium, cadmium, titanium, nickel, palladium, and indium. Any one of the conductive materials listed above may be used independently, or any two or more of the conductive materials listed above may be used in combination. Examples of combinations of conductive materials that can be used include alloys (more specifically, aluminum alloy, stainless steel, or brass). Among the conductive materials listed above, aluminum or an aluminum alloy is preferable in terms of favorable charge mobility from the photosensitive layer 3 to the conductive substrate 2.

The shape of the conductive substrate 2 can be selected as appropriate in accordance with the structure of an image forming apparatus in which the conductive substrate is to be used. The conductive substrate 2 is for example a sheet-shaped conductive substrate or a drum-shaped conductive substrate. The thickness of the conductive substrate 2 can be selected as appropriate in accordance with the shape of the conductive substrate 2.

[2. Photosensitive Layer]

The photosensitive layer 3 contains a charge generating material, a hole transport material, and a binder resin. The binder resin includes the polyarylate resin (1). The photosensitive layer 3 may contain additives. The photosensitive layer 3 of the multi-layer photosensitive member 1 includes the charge generating layer 3a and the charge transport layer 3b. The charge generating layer 3a contains the charge generating material. The charge transport layer 3b contains the hole transport material and the binder resin. No particular limitations are placed on thickness of the charge generating layer 3a so long as the thickness thereof is sufficient to enable the charge generating layer 3a to function as a charge generating layer. The charge generating layer preferably has a thickness of at least 0.01 μm and no greater than 5 μm, and more preferably at least 0.1 μm and no greater than 3 μm. No particular limitations are placed on thickness of the charge transport layer 3b so long as the thickness thereof is sufficient to enable the charge transport layer 3b to function as a charge transport layer. The charge transport layer 3b preferably has a thickness of at least 2 μm and no greater than 100 μm, and more preferably at least 5 μm and no greater than 50 μm.

The photosensitive layer 3 of the single-layer photosensitive member 1 contains a charge generating material, a hole transport material, and a binder resin. No particular limitations are placed on thickness of the single-layer photosensitive layer so long as the thickness thereof is sufficient to enable the single-layer photosensitive layer to function as a single-layer photosensitive layer. Specifically, the single-layer photosensitive layer may have a thickness of at least 5 μm and no greater than 100 μm. Preferably, the single-layer photosensitive layer has a thickness of at least 10 μm and no greater than 50 μm.

[2-1. Common Elements of Configuration]

The following describes the charge generating material, the hole transport material, the binder resin, and the additives. The following further describes a method for producing the photosensitive member 1.

[2-1-1. Charge Generating Material]

No particular limitations are placed on the charge generating material other than being a charge generating material that can be used in the photosensitive member 1. Examples of charge generating materials that can be used include phthalocyanine-based pigments, perylene pigments, bisazo pigments, dithioketopyrrolopyrrole pigments, metal-free naphthalocyanine pigments, metal naphthalocyanine pigments, squaraine pigments, tris-azo pigments, indigo pigments, azulenium pigments, cyanine pigments, powders of inorganic photoconductive materials such as selenium, selenium-tellurium, selenium-arsenic, cadmium sulfide, or amorphous silicon, pyrylium salts, anthanthrone pigments, triphenylmethane pigments, threne pigments, toluidine pigments, pyrazoline pigments, and quinacridone pigments. Examples of phthalocyanine-based pigments that can be used include pigments of phthalocyanine and pigments of phthalocyanine derivatives. Examples of pigments of phthalocyanine include metal-free phthalocyanine pigments (specific examples include an X-form metal-free phthalocyanine pigment (x-$H_2$Pc)). Examples of pigments of phthalocyanine derivatives that can be used include metal phthalocyanine pigments (specific examples include titanyl phthalocyanine pigments and V-form hydroxygallium phthalocyanine pigments). No particular limitations are placed on the crystal structure of the phthalocyanine-based pigment, and phthalocyanine-based pigments having various different crystal structures may be used. The phthalocyanine-based pigment for example has an α-form, a β-form, or a Y-form crystal structure. One charge generating material may be used independently, or two or more charge generating materials may be used in combination. Of the charge generating materials listed above, a Y-form titanyl phthalocyanine pigment is preferable.

The Y-form titanyl phthalocyanine pigment exhibits a main peak at a Bragg angle $2\theta \pm 0.2°=27.2°$ in a CuKα characteristic X-ray diffraction spectrum. The term main peak in a CuKα characteristic X-ray diffraction spectrum refers to a most intense or second most intense peak within a range of Bragg angles ($2\theta \pm 0.2°$) from 3° to 40°.

(Measurement Method of CuKα Characteristic X-Ray Diffraction Spectrum)

The following describes a measurement method of a CuKα characteristic X-ray diffraction spectrum. A sample (titanyl phthalocyanine pigment) is loaded into a sample holder of an X-ray diffraction spectrometer ("RINT (registered Japanese trademark) 1100", product of Rigaku Corporation), and an X-ray diffraction spectrum is measured using a Cu X-ray tube, a tube voltage of 40 kV, a tube current of 30 mA, and CuKα characteristic X-rays having a wavelength of 1.542 Å. The measurement range ($2\theta$) is for example from 3° to 40° (start angle: 3°, stop angle: 40°) and the scanning rate is for example 10°/minute. A main peak in the obtained X-ray diffraction spectrum is determined and a Bragg angle of the main peak is read from the X-ray diffraction spectrum.

Any one charge generating material or a combination of any two or more charge generating materials that is absorptive with respect to light in a desired wavelength region may be used. In a digital optical system image forming apparatus, for example, a photosensitive member that is sensitive to a range of wavelengths that are greater than or equal to 700 nm is preferably used. The digital optical system image forming apparatus may for example be a laser beam printer or facsimile machine in which a light source such as a semiconductor laser is used. Accordingly, for example, a phthalocyanine-based pigment is preferable, and a Y-form titanyl phthalocyanine pigment (Y-TiOPc) is more preferable.

A photosensitive member included in an image forming apparatus that uses a short-wavelength laser light source preferably contains an anthanthrone pigment or a perylene pigment as a charge generating material. The short-wavelength laser light source for example has an approximate wavelength of at least 350 nm and no greater than 550 nm.

The charge generating material is for example any of phthalocyanine pigments represented by chemical formulae (CGM-1) to (CGM-4) (also referred to below as charge generating materials (CGM-1) to (CGM-4)).

[Formula 10]

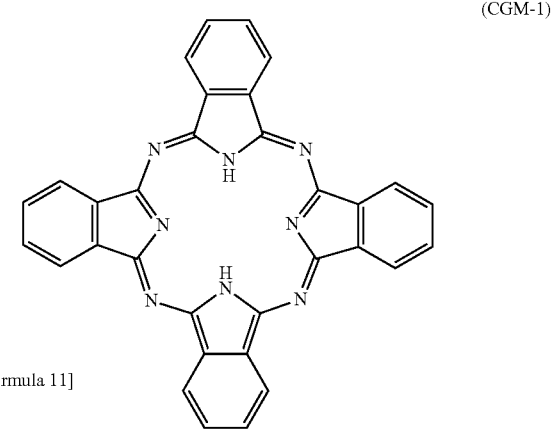

(CGM-1)

[Formula 11]

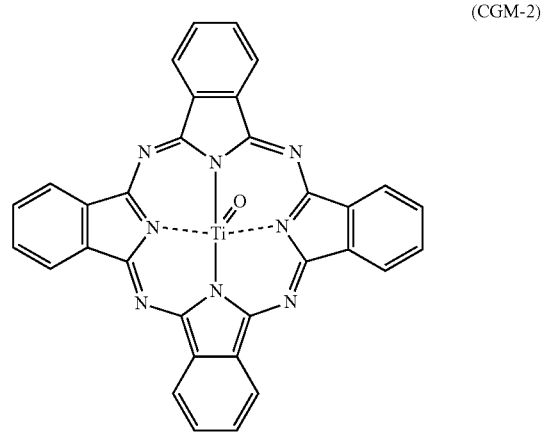

(CGM-2)

[Formula 12]

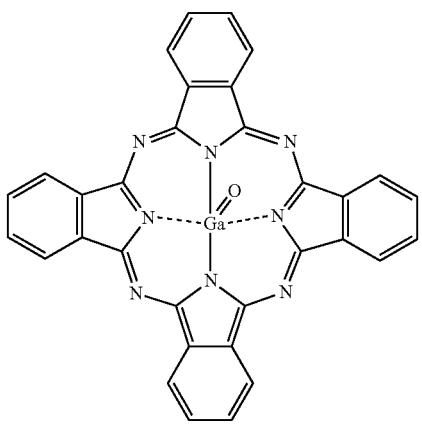

(CGM-3)

[Formula 13]

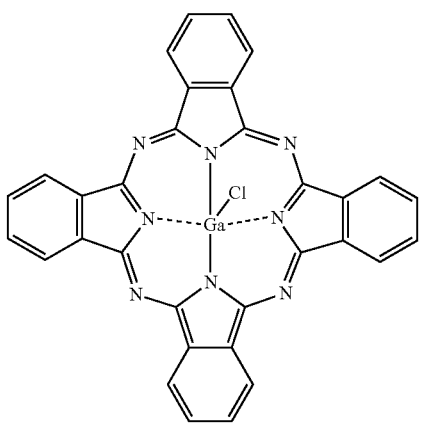

(CGM-4)

The charge generating material is preferably contained in an amount of at least 5 parts by mass and no greater than 1,000 parts by mass relative to 100 parts by mass of a binder resin for the charge generating layer (also referred to below as a base resin), and more preferably in an amount of at least 30 parts by mass and no greater than 500 parts by mass.

[2-1-2. Hole Transport Material]

Examples of hole transport materials that can be used include triphenylamine derivatives, diamine derivatives (specific examples include N,N,N',N'-tetraphenylphenylenediamine derivatives, N,N,N',N'-tetraphenylnaphtylenediamine derivatives, and N,N,N',N'-tetraphenylphenanthrylenediamine derivatives), oxadiazole-based compounds (specific examples include 2,5-di(4-methylaminophenyl)-1,3,4-oxadiazole), styryl-based compounds (specific examples include 9-(4-diethylaminostyryl)anthracene), carbazole-based compounds (specific examples include polyvinyl carbazole), organic polysilane compounds, pyrazoline-based compounds (specific examples include 1-phenyl-3-(p-dimethylaminophenyl)pyrazoline), hydrazone-based compounds, indole-based compounds, oxazole-based compounds, isoxazole-based compounds, thiazole-based compounds, thiadiazole-based compounds, imidazole-based compounds, pyrazole-based compounds, and triazole-based compounds.

Of the hole transport materials listed above, in terms of improving abrasion resistance of the photosensitive member 1, a compound represented by any of general formulae (2), (3), and (4) (also referred to below as hole transport materials (2), (3), and (4)) is preferable. In order to improve sensitivity characteristics of the photosensitive member 1 in addition to abrasion resistance of the photosensitive member 1, the hole transport material preferably includes a compound represented by general formula (2) or (3). More preferably, the hole transport material includes a compound represented by general formula (3).

[Formula 14]

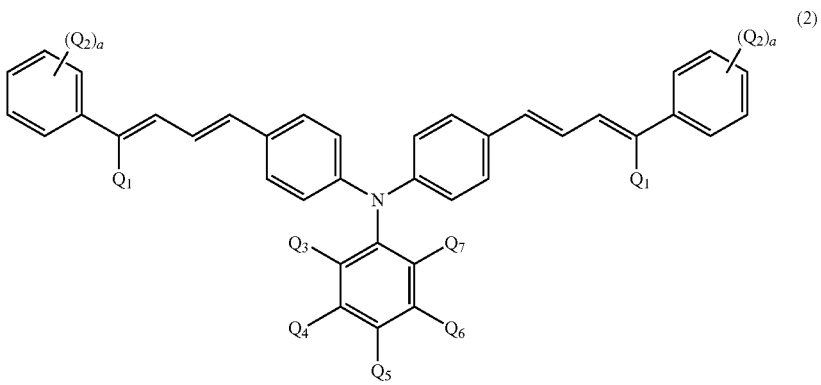

(2)

In general formula (2), $Q_1$ represents a hydrogen atom, an alkyl group having a carbon number of at least 1 and no greater than 8, an alkoxy group having a carbon number of at least 1 and no greater than 8, or a phenyl group which is optionally substituted with an alkyl group having a carbon number of at least 1 and no greater than 8. Chemical groups $Q_2$ each represent, independently of one another, an alkyl group having a carbon number of at least 1 and no greater than 8, an alkoxy group having a carbon number of at least 1 and no greater than 8, or a phenyl group. $Q_3$, $Q_4$, $Q_5$, $Q_7$ and $Q_7$ each represent, independently of one another, a hydrogen atom, an alkyl group having a carbon number of at least 1 and no greater than 8, an alkoxy group having a carbon number of at least 1 and no greater than 8, or a phenyl group. Adjacent two members among $Q_3$, $Q_4$, $Q_5$, $Q_6$, and $Q_7$ are optionally bonded to one another to form a ring. a represents an integer of at least 0 and no greater than 5. When a represents an integer of at least 2 and no greater than 5, chemical groups $Q_2$ bonded to the same phenyl group may be the same as or different from one another.

In general formula (3), $Q_5$, $Q_{10}$, $Q_{11}$, $Q_{12}$, $Q_{13}$, and $Q_{14}$ each represent, independently of one another, a hydrogen atom, an alkyl group having a carbon number of at least 1 and no greater than 8, an alkoxy group having a carbon number of at least 1 and no greater than 8, or a phenyl group. $Q_9$ and $Q_{15}$ each represent, independently of one another, an alkyl group having a carbon number of at least 1 and no greater than 8, an alkoxy group having a carbon number of at least 1 and no greater than 8, or a phenyl group. b represents an integer of at least 0 and no greater than 5. When b represents an integer of at least 2 and no greater than 5, chemical groups $Q_9$ bonded to the same phenyl group may be the same as or different from one another. c represents an integer of at least 0 and no greater than 4. When c represents an integer of at least 2 and no greater than 4, chemical groups $Q_{15}$ bonded to the same phenylene group may be the same as or different from one another. k represents 0 or 1.

[Formula 15]

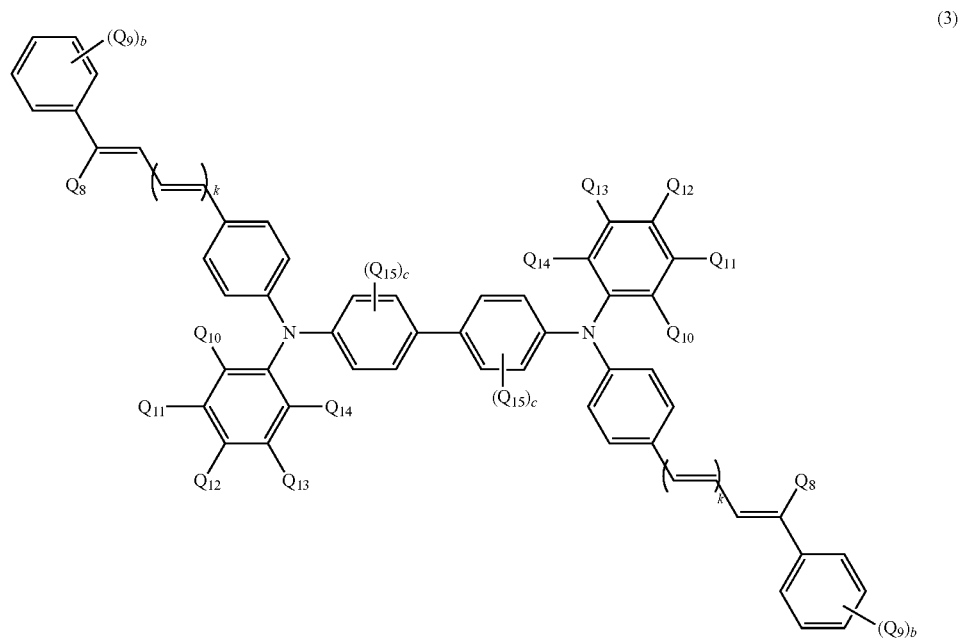

(3)

[Formula 16]

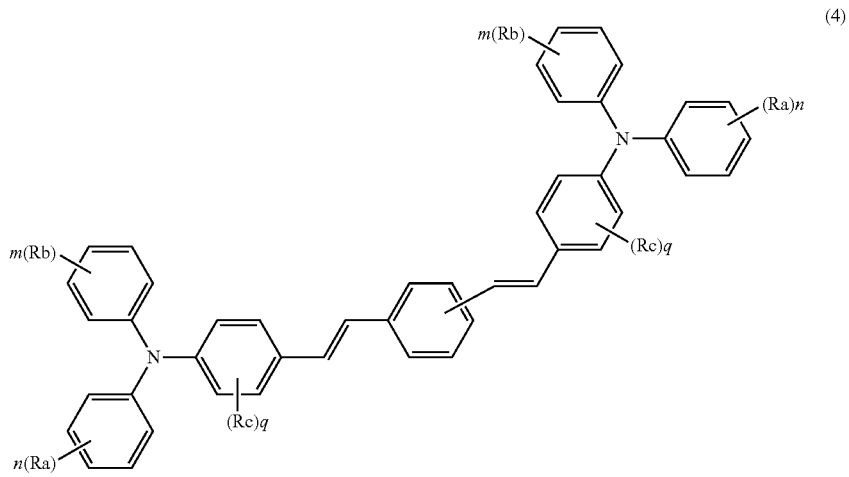

(4)

In general formula (4), $R_a$, $R_b$, and $R_c$ each represent, independently of one another, an alkyl group having a carbon number of at least 1 and no greater than 8, a phenyl group, or an alkoxy group having a carbon number of at least 1 and no greater than 8. q represents an integer of at least 0 and no greater than 4. When q represents an integer of at least 2 and no greater than 4, chemical groups $R_c$ bonded to the same phenylene group may be the same as or different from one another. m and n each represent, independently of one another, an integer of at least 0 and no greater than 5. When m represents an integer of at least 2 and no greater than 5, chemical groups $R_b$ bonded to the same phenyl group may be the same as or different from one another. When n represents an integer of at least 2 and no greater than 5, chemical groups $R_a$ bonded to the same phenyl group may be the same as or different from one another.

In general formula (2), the phenyl group that may be represented by $Q_1$ is preferably a phenyl group substituted with an alkyl group having a carbon number of at least 1 and no greater than 8, more preferably a phenyl group substituted with a methyl group, and still more preferably a p-methylphenyl group.

In general formula (2), the alkyl group having a carbon number of at least 1 and no greater than 8 that may be represented by $Q_2$ is preferably an alkyl group having a carbon number of at least 1 and no greater than 6, more preferably an alkyl group having a carbon number of at least 1 and no greater than 4, and still more preferably a methyl group. Preferably, a represents 0 or 1.

In general formula (2), the alkyl group having a carbon number of at least 1 and no greater than 8 that may be represented by $Q_3$ to $Q_7$ is preferably an alkyl group having a carbon number of at least 1 and no greater than 4, and more preferably an n-butyl group. In general formula (2), the alkoxy group having a carbon number of at least 1 and no greater than 8 that may be represented by $Q_3$ to $Q_7$ is preferably an alkoxy group having a carbon number of at least 1 and no greater than 4, and more preferably a methoxy group or an ethoxy group. In general formula (2), $Q_3$ to $Q_7$ each preferably represent, independently of one another, a hydrogen atom, an alkyl group having a carbon number of at least 1 and no greater than 8, or an alkoxy group having a carbon number of at least 1 and no greater than 8, and more preferably a hydrogen atom, an alkyl group having a carbon number of at least 1 and no greater than 4, or an alkoxy group having a carbon number of at least 1 and no greater than 4.

In general formula (2), adjacent two members among $Q_3$ to $Q_7$ are optionally bonded to one another to form a ring (more specifically, a benzene ring or a cycloalkane having a carbon number of at least 5 and no greater than 7). For example, adjacent $Q_6$ and $Q_7$ among $Q_3$ to $Q_7$ are optionally bonded to one another to form a benzene ring or a cycloalkane having a carbon number of at least 5 and no greater than 7. When adjacent two members among $Q_3$ to $Q_7$ are bonded to one another to form a benzene ring, the benzene ring forms a bicyclic fused ring group (naphthyl group) through fusion with the phenyl group bonded to $Q_3$ to $Q_7$. When adjacent two members among $Q_3$ to $Q_7$ are bonded to one another to form a cycloalkane having a carbon number of at least 5 and no greater than 7, the cycloalkane having a carbon number of at least 5 and no greater than 7 forms a bicyclic fused ring group through fusion with the phenyl group bonded to $Q_3$ to $Q_7$. In such a case, the site of fusion between the phenyl group and the cycloalkane having a carbon number of at least 5 and no greater than 7 may include a double bond. Two adjacent members among $Q_3$ to $Q_7$ preferably form a cycloalkane having a carbon number of at least 5 and no greater than 7, and more preferably form a cyclohexane.

Preferably, in general formula (2), $Q_1$ represents a hydrogen atom or a phenyl group substituted with an alkyl group having a carbon number of at least 1 and no greater than 8. $Q_2$ represents an alkyl group having a carbon number of at least 1 and no greater than 8, $Q_3$ to $Q_7$ each represent, independently of one another, a hydrogen atom, an alkyl group having a carbon number of at least 1 and no greater than 8, or an alkoxy group having a carbon number of at least 1 and no greater than 8, and a represents 0 or 1. Preferably, two adjacent members among $Q_3$ to $Q_7$ are bonded to one another to form a ring.

In general formula (3), the alkyl group having a carbon number of at least 1 and no greater than 8 that may be represented by $Q_8$ and $Q_{10}$ to $Q_{14}$ is preferably an alkyl group having a carbon number of at least 1 and no greater than 4, and more preferably a methyl group or an ethyl group. Preferably, in general formula (3), $Q_8$ and $Q_{10}$ to $Q_{14}$ each represent, independently of one another, a hydrogen atom, an alkyl group having a carbon number of at least 1 and no greater than 4, or a phenyl group, and b and c each represent 0.

Preferably, in general formula (4), the alkyl group having a carbon number of at least 1 and no greater than 8 that may be represented by $R_a$ and $R_b$ is a methyl group, an ethyl group, or an n-octyl group. Preferably, in general formula (4), $R_a$ and $R_b$ each represent an alkyl group having a carbon number of at least 1 and no greater than 8, m and n each represent, independently of one another, 0 or 1, and q represents 0.

Examples of the hole transport material (2) include hole transport materials represented by chemical formulae (HTM-1) to (HTM-4) (also referred to below as hole transport materials (HTM-1) to (HTM-4)). Examples of the hole transport material (3) include hole transport materials represented by chemical formulae (HTM-5) to (HTM-7) (also referred to below as hole transport materials (HTM-5) to (HTM-7)). Examples of the hole transport material (4) include hole transport materials represented by chemical formulae (HTM-8) to (HTM-10) (also referred to below as hole transport materials (HTM-8) to (HTM-10)).

[Formula 17]

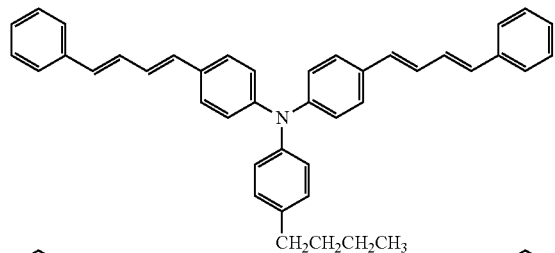
(HTM-1)

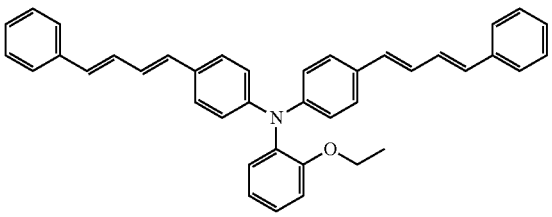
(HTM-2)

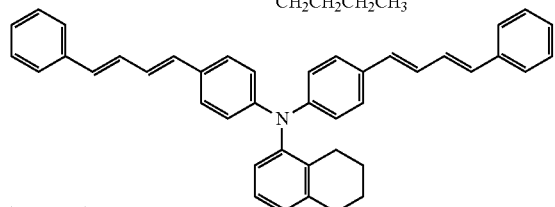
(HTM-3)

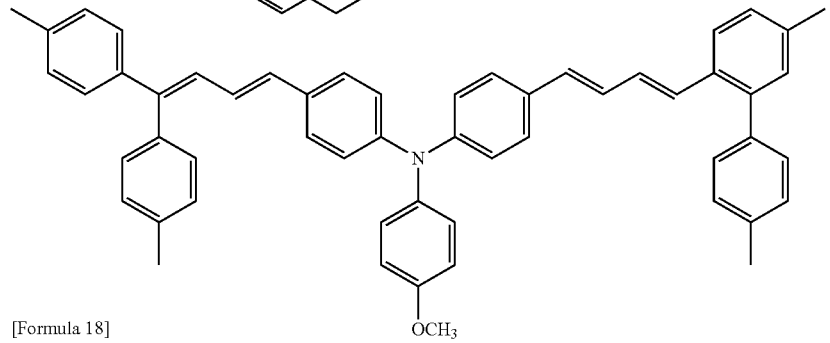
(HTM-4)

[Formula 18]

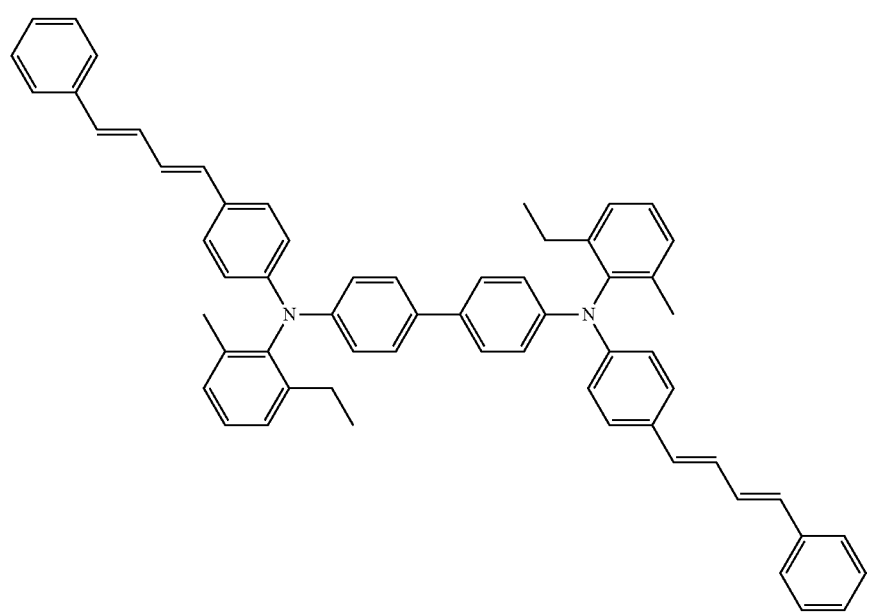
(HTM-5)

(HTM-6)

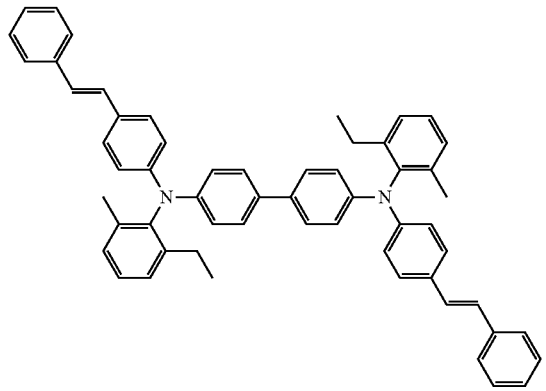

(HTM-7)

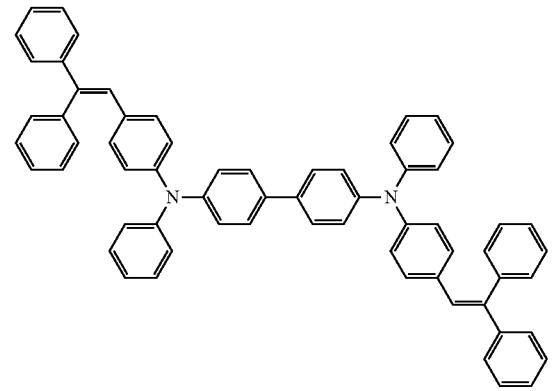

[Formula 19]

(HTM-8)

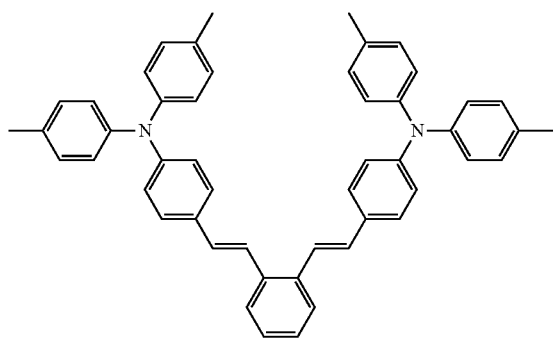

(HTM-9)

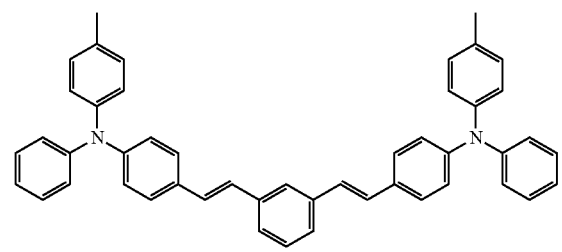

(HTM-10)

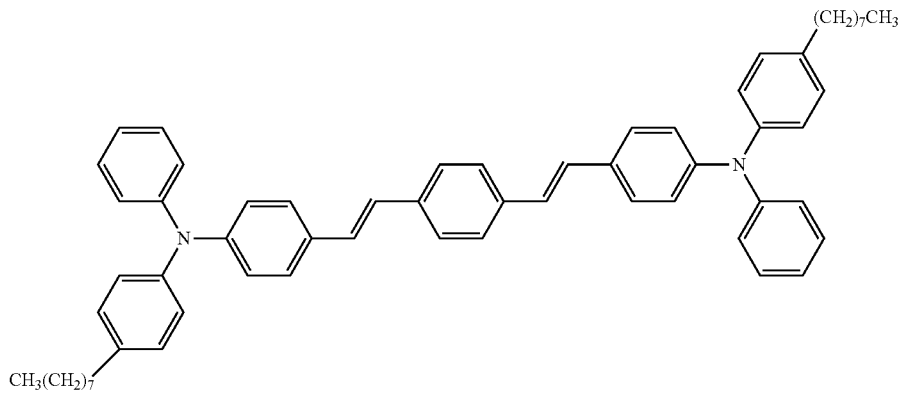

The hole transport material is preferably contained in the multi-layer photosensitive member in an amount of at least 10 parts by mass and no greater than 200 parts by mass relative to 100 parts by mass of the binder resin, and more preferably in an amount of at least 20 parts by mass and no greater than 100 parts by mass.

[2-1-3. Binder Resin]

The binder resin is used in the charge transport layer of the multi-layer photosensitive member or in the photosensitive layer of the single-layer photosensitive member. The binder resin includes the polyarylate resin (1).

The binder resin may solely include the polyarylate resin (1) or may include an optional resin other than the polyarylate resin (1) so long as the effects of the present disclosure are still achieved. Examples of optional resins that can be used include thermoplastic resins, thermosetting resins, and photocurable resins. Examples of thermoplastic resins that can be used include polyarylate resins other than the polyarylate resin (1), polycarbonate resins, styrene-based resins, styrene-butadiene copolymers, styrene-acrylonitrile copolymers, styrene-maleic acid copolymers, styrene-acrylic acid copolymers, acrylic copolymers, polyethylene resins, ethylene-vinyl acetate copolymers, chlorinated polyethylene resins, polyvinyl chloride resins, polypropylene resins, ionomers, vinyl chloride-vinyl acetate copolymers, polyester resins, alkyd resins, polyamide resins, polyurethane resins, polysulfone resins, diallyl phthalate resins, ketone resins, polyvinyl butyral resins, and polyether resins. Examples of thermosetting resins that can be used include silicone resins, epoxy resins, phenolic resins, urea resins, melamine resins, and other crosslinkable thermosetting resins. Examples of photocurable resins that can be used include epoxy-acrylic acid-based resins and urethane-acrylic acid-based copolymers. Any one of the resins listed above may be used independently, or any two or more of the resins listed above may be used in combination. The polyarylate resin (1) is preferably contained in an amount of at least 80 parts by mass relative to 100 parts by mass of the binder resin, more preferably in an amount of at least 90 parts by mass, and still more preferably in an amount of at least 100 parts by mass.

In the second embodiment, the binder resin content is preferably at least 40% by mass and no greater than 80% by mass of the total mass of all the components included in the charge transport layer (for example, the hole transport material and the binder resin).

[2-1-4. Additives]

At least one of the charge generating layer 3a, the charge transport layer 3b, the single-layer photosensitive layer, and the intermediate layer 4 may contain various additives so long as such additives do not adversely affect electrophotographic properties of the photosensitive member. Examples of additives that can be used include antidegradants (specific examples include antioxidants, radical scavengers, quenchers, and ultraviolet absorbing agents), softeners, surface modifiers, extenders, thickeners, dispersion stabilizers, waxes, electron acceptor compounds, donors, surfactants, and leveling agents.

Examples of antioxidants that can be used include hindered phenol compounds, hindered amine compounds, thioether compounds, and phosphite compounds. Of the antioxidants listed above, hindered phenol compounds and hindered amine compounds are preferable.

The amount of the antioxidant contained in the charge transport layer 3b is preferably at least 0.1 parts by mass and no greater than 10 parts by mass relative to 100 parts by mass of the binder resin. As a result of the amount of the antioxidant being within the above-specified range, reduction in electrical properties due to oxidation of the photosensitive member is easily inhibited.

Examples of electron acceptor compounds that can be used include diphenoquinone derivatives. Examples of preferable electron acceptor compounds include 3,3',5,5'-tetra-tert-butyl-4,4'-diphenoquinone.

[2-2. Non-Common Elements of Configuration]

The charge generating layer 3a of the multi-layer photosensitive member 1 may contain a binder resin for the charge generating layer (also referred to below as a base resin). No particular limitations are placed on the base resin other than being a base resin that can be used in the photosensitive member 1. Examples of base resins that can be used include thermoplastic resins, thermosetting resins, and photocurable resins. Examples of thermoplastic resins that can be used include styrene-based resins, styrene-butadiene copolymers, styrene-acrylonitrile copolymers, styrene-maleic acid copolymers, styrene-acrylic acid-based copolymers, acrylic copolymers, polyethylene resins, ethylene-vinyl acetate copolymers, chlorinated polyethylene resins, polyvinyl chloride resins, polypropylene resins, ionomers, vinyl chloride-vinyl acetate copolymers, alkyd resins, polyamide resins, urethane resins, polycarbonate resins, polyarylate resins, polysulfone resins, diallyl phthalate resins, ketone resins, polyvinyl butyral resins, polyether resins, and polyester resins. Examples of thermosetting resins that can be used include silicone resins, epoxy resins, phenolic resins, urea resins, melamine resins, and other crosslinkable thermosetting resins. Examples of photocurable resins that can be used include epoxy-acrylic acid-based resins and urethane-acrylic acid-based resins. Any one of the base resins listed above may be used independently, or any two or more of the base resins listed above may be used in combination.

Although resins that are listed as examples of the binder resin described earlier are also listed as examples of the base resin, a resin that is different from the binder resin is normally selected as the base resin in the same multi-layer photosensitive member 1 for the following reason. In production of the multi-layer photosensitive member 1, the charge generating layer 3a and the charge transport layer 3b are normally formed in the stated order, and thus an application liquid for charge transport layer formation is normally coated onto the charge generating layer 3a. The charge generating layer 3a is preferably insoluble in a solvent of the application liquid for charge transport layer formation during the formation of the charge transport layer 3b. Therefore, a resin that is different from the binder resin is normally selected as the base resin in the same multi-layer photosensitive member 1.

[3. Intermediate Layer]

The photosensitive member 1 according to the second embodiment may optionally include the intermediate layer 4 (for example, an underlayer). The intermediate layer 4 for example contains inorganic particles and a resin (intermediate layer resin). Provision of the intermediate layer 4 can facilitate flow of current generated when the photosensitive member 1 is exposed to light and inhibit increasing resistance, while also maintaining insulation to a sufficient degree so as to inhibit occurrence of leakage current.

Examples of inorganic particles that can be used include particles of metals (specific examples include aluminum, iron, and copper), metal oxides (specific examples include titanium oxide, alumina, zirconium oxide, tin oxide, and zinc oxide), and non-metal oxides (specific examples include silica). Any one type of the inorganic particles listed below may be used independently, or any two or more types of the inorganic particles listed below may be used in combination. The organic particles may be surface-treated.

No particular limitations are placed on the intermediate layer resin other than being a resin that can be used to form the intermediate layer 4.

[4. Production Method of Photosensitive Member 1]

The following describes a method for producing the photosensitive member 1. The production method of the photosensitive member 1 for example includes a photosensitive layer formation process.

[4-1. Production Method of Multi-Layer Photosensitive Member]

The photosensitive layer formation process of the production method of the multi-layer photosensitive member 1 includes a charge generating layer formation process and a charge transport layer formation process. In the charge generating layer formation process, first, an application liquid for formation of the charge generating layer 3a (also referred to below as an application liquid for charge generating layer formation) is prepared. The application liquid for charge generating layer formation is applied onto the conductive substrate 2 to form a film. Next, the film is dried by an appropriate method to remove at least a portion of a solvent in the film. Thus, the charge generating layer 3a is formed. The application liquid for charge generating layer formation for example includes a charge generating material, a base resin, and a solvent. The application liquid for charge generating layer formation can be prepared by dissolving or dispersing the charge generating material and the base resin in the solvent. Additives may optionally be added to the application liquid for charge generating layer formation.

In the charge transport layer formation process, first, an application liquid for formation of the charge transport layer 3b (also referred to below as an application liquid for charge transport layer formation) is prepared. The application liquid for charge transport layer formation is applied onto the charge generating layer 3a to form a film. Next, the film is dried by an appropriate method to remove at least a portion of a solvent in the film. Thus, the charge transport layer 3b is formed. The application liquid for charge transport layer formation includes a hole transport material, the polyarylate resin (1) serving as a binder resin, and a solvent. The application liquid for charge transport layer formation can be prepared by dissolving or dispersing the hole transport material and the polyarylate resin (1) in the solvent. Additives may optionally be added to the application liquid for charge transport layer formation.

[4-2. Production Method of Single-Layer Photosensitive Member]

In the photosensitive layer formation process of the production method of the single-layer photosensitive member 1, an application liquid for formation of the photosensitive layer 3 (also referred to below as an application liquid for photosensitive layer formation) is prepared. The application liquid for photosensitive layer formation is applied onto the conductive substrate 2 to form a film. Next, the film is dried by an appropriate method to remove at least a portion of a solvent in the film. Thus, the photosensitive layer 3 is formed. The application liquid for photosensitive layer formation for example includes a charge generating material, a hole transport material, the polyarylate resin (1) serving as a binder resin, and a solvent. The application liquid for photosensitive layer formation can be prepared by dissolving or dispersing the charge generating material, the hole transport material, and the polyarylate resin (1) in the solvent. Additives may optionally be added to the application liquid for photosensitive layer formation.

The following describes the photosensitive layer formation process in detail. No particular laminations are placed on the solvents contained in the application liquid for charge generating layer formation, the application liquid for charge transport layer formation, and the application liquid for photosensitive layer formation (these three application liquids are also collectively referred to below as the application liquid) other than that the components of the application liquids should be soluble or dispersible in the solvents and the solvents are easily removable from the resultant films by drying. Examples of solvents that can be used include alcohols (specific examples include methanol, ethanol, isopropanol, and butanol), aliphatic hydrocarbons (specific examples include n-hexane, octane, and cyclohexane), aromatic hydrocarbons (specific examples include benzene, toluene, and xylene), halogenated hydrocarbons (specific examples include dichloromethane, dichloroethane, carbon tetrachloride, and chlorobenzene), ethers (specific examples include dimethyl ether, diethyl ether, tetrahydrofuran, ethylene glycol dimethyl ether, and diethylene glycol dimethyl ether), ketones (specific examples include acetone, methyl ethyl ketone, and cyclohexanone), esters (specific examples include ethyl acetate and methyl acetate), dimethyl formaldehyde, dimethyl formamide, and dimethyl sulfoxide. Any one of the solvents listed above may be used independently, or any two or more of the solvents listed above may be used in combination. Of the solvents listed above, a non-halogenated solvent is preferably used. Examples of combinations of solvents that can be used include combined solvents (specific examples include a combined solvent of methanol, butanol, and toluene, a combined solvent of propylene glycol monomethyl ether and tetrahydrofuran; and a combined solvent of tetrahydrofuran and toluene).

In production of the multi-layer photosensitive member 1, the charge generating layer 3a and the charge transport layer 3b are normally formed in the stated order, and thus the application liquid for charge transport layer formation is normally coated onto the charge generating layer 3a The charge generating layer 3a is required to be insoluble in the solvent of the application liquid for charge transport layer formation in the formation of the charge transport layer. Therefore, the solvent contained in the application liquid for charge transport layer formation is preferably different from the solvent contained in the application liquid for charge generating layer formation.

The application liquid is prepared by mixing the components to disperse the components in the solvent. Mixing or dispersion can for example be performed using a bead mill, a roll mill, a ball mill, an attritor, a paint shaker, or an ultrasonic disperser.

The application liquid may for example include a surfactant or a leveling agent in order to improve dispersibility of the components or improve surface flatness of the formed layers.

No particular limitations are placed on the method by which the application liquid is applied so long as the method enables uniform application of the application liquid. Examples of application methods that can be used include dip coating, spray coating, spin coating, and bar coating.

No particular limitations are placed on the method by which at least a portion of the solvent in the application liquid is removed other than being a method that enables evaporation of the solvent in the application liquid. Examples of methods that can be used to remove the solvent include heating, pressure reduction, and a combination of heating and pressure reduction. One specific example of a method involves heat treatment (hot-air drying) using a high-temperature dryer or a reduced pressure dryer. The heat treatment is for example performed for at least 3 minutes and no greater than 120 minutes at a temperature of at least 40° C. and no greater than 150° C.

Note that the production method of the photosensitive member 1 may further include a process of forming the intermediate layer 4 as necessary. The process of forming the intermediate layer 4 can be carried out by a method selected appropriately from known methods.

EXAMPLES

The following provides more specific description of the present disclosure through use of Examples. However, it should be noted that the present disclosure is not limited to the scope of the Examples.

<Preparation of Polyarylate Resin>

[Preparation of Polyarylate Resin (Resin-1)]

A three-necked flask was used as a reaction vessel. The reaction vessel was a 1-L three-necked flask equipped with a thermometer, a three-way cock, and a 200-mL dripping funnel. Into the reaction vessel, 25.63 g (82.86 mmol) of 1,1-bis(4-hydroxyphenyl)-3,3-dimethyl-5-methylcyclohexane, 0.124 g (0.826 mmol) of t-butylphenol, 7.84 g (196 mmol) of sodium hydroxide, and 0.240 g (0.768 mmol) of benzyltributylammonium chloride were added. Next, the reaction vessel was purged with argon. Next, 600 mL of water was added into the reaction vessel. The reaction vessel contents were stirred for 1 hour while the internal temperature of the reaction vessel was maintained at 20° C. Thereafter, the internal temperature of the reaction vessel was reduced to 10° C. As a result, an alkaline aqueous solution was obtained.

Separately from the alkaline aqueous solution, 9.84 g (38.9 mmol) of 2,6-naphthalenedicarboxylic acid dichloride and 11.47 g (38.9 mmol) of 4,4'-oxybisbenzoic acid dichloride were dissolved in 300 g of chloroform. As a result, a chloroform solution was obtained.

Next, the temperature of the alkaline aqueous solution was adjusted to 10° C. The chloroform solution was gradually dripped into the alkaline aqueous solution through a dripping funnel over 110 minutes to initiate a polymerization reaction. The internal temperature of the reaction vessel was adjusted to 13±3° C., and the polymerization reaction was caused to proceed while the reaction vessel contents were stirred for 3 hours.

Thereafter, decantation was performed to remove an upper layer (water layer) from the reaction vessel contents to collect an organic layer. Next, 500 mL of ion exchanged water was added into a 2-L three-necked flask, and then the collected organic layer was added into the flask. Furthermore, 300 g of chloroform and 6 mL of acetic acid were added into the flask. The contents of the three-necked flask were stirred at room temperature (25° C.) for 30 minutes. Thereafter, decantation was performed to remove an upper layer (water layer) from the contents of the three-necked flask to collect an organic layer. The collected organic layer was washed with 500 mL of water eight times using a separatory funnel. As a result, the water-washed organic layer was obtained.

Next, the water-washed organic layer was filtered to collect a filtrate. Into a 3-L conical flask, 1.5 L of methanol was added. The collected filtrate was gradually dripped into the conical flask to give a precipitate. The precipitate was filtered off. The thus collected precipitate was vacuum dried for 12 hours at 70° C. As a result, the polyarylate resin (Resin-1) was obtained. The mass yield of the polyarylate resin (Resin-1) was 35.3 g, and the percentage yield thereof was 88.7 mol %.

[Preparation of Polyarylate Resins (Resin-2) to (Resin-6)]

Each of the polyarylate resins (Resin-2) to (Resin-6) was prepared according to the same method as the preparation method of the polyarylate resin (Resin-1) in all aspects other than the following. At least one of the starting materials of the polyarylate resin (Resin-1), that is, at least one of the 1,1-bis(4-hydroxyphenyl)-3,3-dimethyl-5-methylcyclohexane, which was an aromatic diol, the 2,6-naphthalenedicarboxylic acid dichloride, which was an alkanoyl halide of an aromatic dicarboxylic acid, and the 4,4'-oxybisbenzoic acid dichloride, which was an alkanoyl halide of an aromatic dicarboxylic acid, was changed to a starting material (an aromatic diol or an alkanoyl halide of an aromatic dicarboxylic acid) of the polyarylate resin. In the case of the polyarylate resin in which two different aromatic diols were used as starting materials thereof, the molar ratio between the two different aromatic diols was determined so as to give a specified mole fraction ratio therebetween.

[Preparation of Polyarylate Resins (Resin-7) to (Resin-10)]

Each of the polyarylate resins (Resin-7) to (Resin-10) was prepared according to the same method as the preparation method of the polyarylate resin (Resin-5) in all aspects other than the following. The molar ratio between the alkanoyl halides of the two different aromatic dicarboxylic acids was changed so as to give a specified mole fraction ratio therebetween.

Next, a proton nuclear magnetic resonance spectrometer (product of JASCO Corporation, 300 MHz) was used to measure $^1$H-NMR spectra of the polyarylate resins (Resin-1) to (Resin-10) prepared as described above. CDCl$_3$ was used as a solvent. Tetramethylsilane (TMS) was used as an internal standard sample. Of the polyarylate resins (Resin-1) to (Resin-10), the polyarylate resin (Resin-1) will be described as a representative example.

Figure 3:
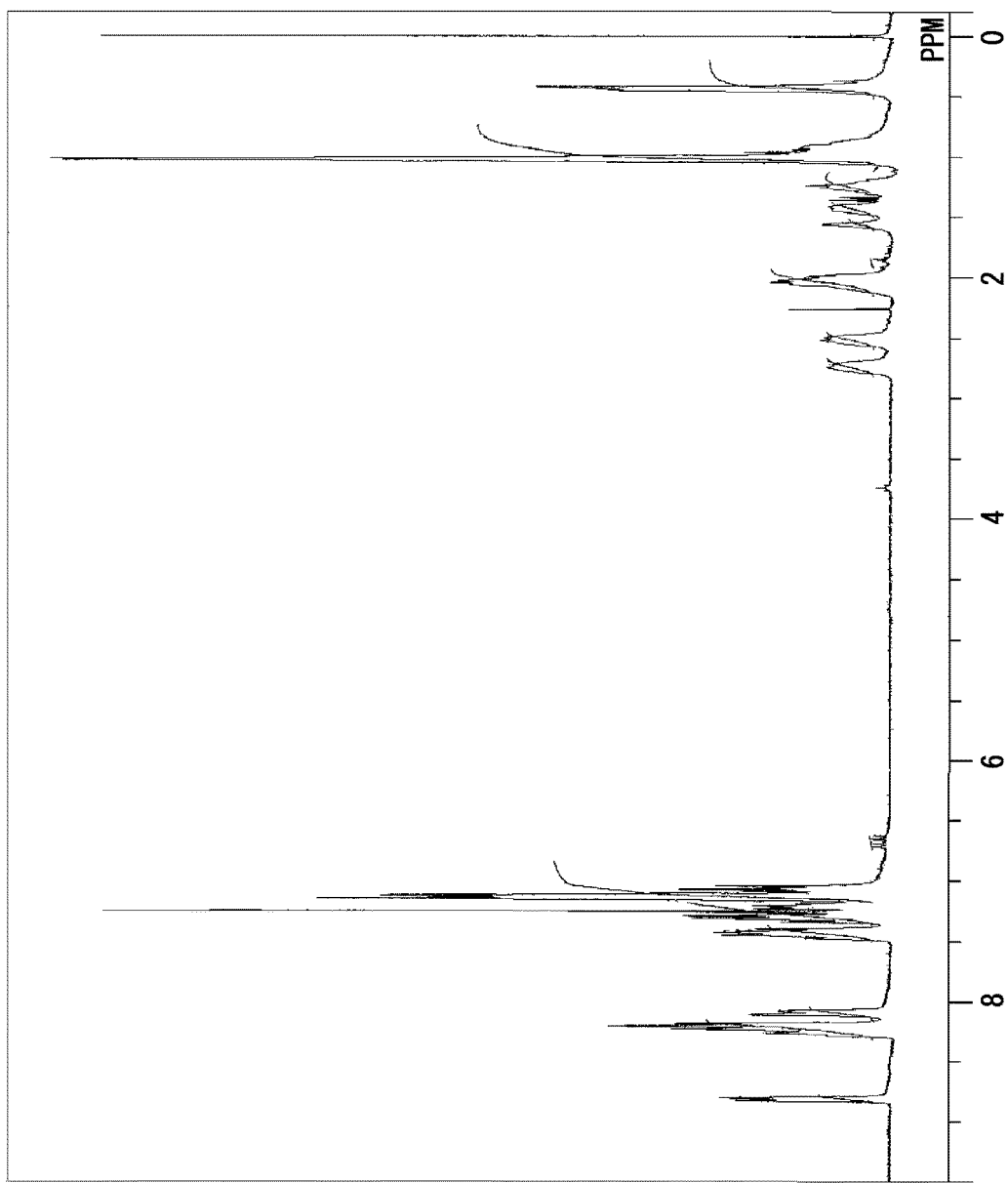
FIG. 3 is a $^1$H-NMR spectrum of a polyarylate resin represented by chemical formula (Resin-1).

FIG. 3 is a $^1$H-NMR spectrum of the polyarylate resin (Resin-1). In FIG. 3, the horizontal axis represents chemical shift (unit: ppm), and the vertical axis represents signal intensity (unit: arbitrary unit). Chemical shifts of the polyarylate resin (Resin-1) are shown below. The polyarylate resin (Resin-1): 8.81 (d, 2H), 8.17-8.26 (m, 6H), 8.09 (d, 2H), 7.02-7.48 (m, 20H), 2.74 (brs, 2H), 2.50 (brs, 2H), 2.02 (brm, 4H), 1.41 (brs, 2H), 1.23 (brs, 2H), 0.99 (d, 12H), 0.42 (d, 6H)

The $^1$H-NMR spectrum and the chemical shifts were used to confirm that the polyarylate resin (Resin-1) was obtained. Likewise, the $^1$H-NMR spectra and chemical shifts of the other polyarylate resins (Resin-2) to (Resin-10) were used to confirm that the polyarylate resins (Resin-2) to (Resin-10) were obtained.

<Materials of Photosensitive Members>

(Binder Resin)

The polyarylate resins (Resin-1) to (Resin-10) were prepared as binder resins as described above. Furthermore, a polyarylate resin (Resin-11) was prepared. The polyarylate resin (Resin-11) is represented by chemical formula (Resin-11) shown below.

[Formula 20]

(Resin-11)

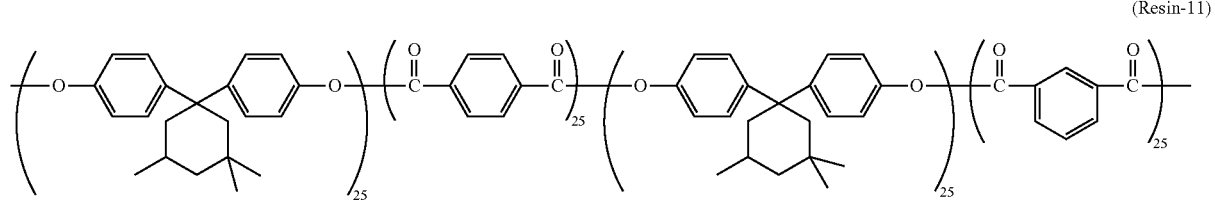

(Charge Generating Material)

The charge generating material (CGM-2) described in association with the second embodiment was prepared. The charge generating material (CGM-2) was a Y-form titanyl phthalocyanine pigment (Y-form titanyl phthalocyanine crystals) represented by chemical formula (CGM-2). The crystal structure thereof was Y-form.

The Y-form titanyl phthalocyanine crystals exhibited peaks at Bragg angles 2θ±0.2°=9.2°, 14.5°, 18.1°, 24.1°, and 27.2° in a CuKα characteristic X-ray diffraction spectral chart, of which the peak at a Bragg angle 2θ±0.2°=27.2° was a main peak. The CuKα characteristic X-ray diffraction spectrum was measured using the measuring device and measurement conditions described in association with the second embodiment.

(Hole Transport Material)

The hole transport materials (HTM-1) to (HTM-10) described in association with the second embodiment were prepared.

<Production of Photosensitive Members>

[Production of Photosensitive Member (A-1)]

The following describes a method for producing a photosensitive member (A-1) according to Example 1.

(Intermediate Layer Formation)

First, surface-treated titanium oxide ("test sample SMT-A", product of Tayca Corporation, number average primary particle diameter 10 nm) was prepared. More specifically, titanium oxide was surface-treated using alumina and silica and was also subsequently surface-treated using methyl hydrogen polysiloxane while being subjected to wet dispersion. Next, the surface-treated titanium oxide (2 parts by mass) and AMILAN (registered Japanese trademark) ("CM8000", product of Toray Industries, Inc.), which was a four-component copolymer polyamide resin of polyamide 6, polyamide 12, polyamide 66, and polyamide 610, (1 part by mass) were added to a combined solvent. The combined solvent contained methanol (10 parts by mass), butanol (1 part by mass), and toluene (1 part by mass). A bead mill was used to mix the materials (the surface-treated titanium oxide and the polyamide resin) with the combined solvent for 5 hours to disperse the materials in the combined solvent. Thus, an application liquid for intermediate layer formation was prepared.

The application liquid for intermediate layer formation was filtered using a filter having a pore size of 5 μm. Next, the application liquid for intermediate layer formation was applied onto the surface of a conductive substrate—an aluminum drum-shaped support (diameter 30 mm, total length 246 mm)—by dip coating to form a film. Next, the film was dried for 30 minutes at 130° C., thereby forming an intermediate layer (film thickness 1.5 μm) on the conductive substrate (drum-shaped support).

(Charge Generating Layer Formation)

The Y-form titanyl phthalocyanine pigment (1.5 parts by mass) and a polyvinyl acetal resin ("S-LEC BX-5", product of Sekisui Chemical Co., Ltd.) (1 part by mass) as a base resin were added to a combined solvent. The combined solvent contained propylene glycol monomethyl ether (40 parts by mass) and tetrahydrofuran (40 parts by mass). A bead mill was used to mix the materials (the Y-form titanyl phthalocyanine pigment and the polyvinyl acetal resin) with the combined solvent for 12 hours to disperse the materials in the combined solvent. Thus, an application liquid for charge generating layer formation was prepared. The application liquid for charge generating layer formation was filtered using a filter having a pore size of 3 μm. Next, the resultant filtrate was applied by dip coating onto the intermediate layer formed as described above to form a film. The film was dried for 5 minutes at 50° C. Thus, a charge generating layer (film thickness 0.3 μm) was formed on the intermediate layer.

(Charge Transport Layer Formation)

To a combined solvent, 50 parts by mass of the hole transport material (HTM-1) as a hole transport material, 2 parts by mass of a hindered phenol antioxidant ("IRGANOX (registered Japanese trademark) 1010", product of BASF Japan Ltd.) as an additive, 2 parts by mass of 3,3',5,5'-tetra-tert-butyl-4,4'-diphenoquinone as an electron acceptor compound, and 100 parts by mass of the polyarylate resin (Resin-1) (viscosity average molecular weight 49,200) as a binder resin were added. The combined solvent contained 550 parts by mass of tetrahydrofuran and 150 parts by mass of toluene. The materials (the hole transport material (HTM-1), the hindered phenol antioxidant, the 3,3',5,5'-tetra-tert-butyl-4,4'-diphenoquinone, and the polyarylate resin (Resin-1)) were mixed with the combined solvent for 12 hours to disperse the materials in the combined solvent. Thus, an application liquid for charge transport layer formation was prepared.

The application liquid for charge transport layer formation was filtered using a filter having a pore size of 3 μm. Next, the resultant filtrate was applied by dip coating onto the charge generating layer formed as described above and was dried for 40 minutes at 120° C. Thus, a charge transport layer (film thickness 20 μm) was formed on the charge generating layer. Through the above, the photosensitive member (A-1) was obtained. The photosensitive member (A-1) had a structure in which the intermediate layer, the charge generating layer, and the charge transport layer were laminated to the conductive substrate in the stated order.

[Photosensitive Members (A-2) to (A-19) and (B-1)]

Photosensitive members (A-2) to (A-19) and (B-1) were produced according to the same method as the production method of the photosensitive member (A-1) in all aspects other than the following changes. While the transport material (HTM-1) was used in the production of the photosensitive member (A-1), the hole transport materials as shown in Table 1 were used. While the polyarylate resin (Resin-1) was used in the production of the photosensitive member (A-1), the binder resins as shown in Table 1 were used.

<Evaluation of Photosensitive Member Properties>

(Measurement of Charge Potential $V_0$)

With respect to each of the photosensitive members (A-1) to (A-19) and (B-1), a surface potential of the photosensitive member was measured using a drum sensitivity test device (product of Gen-Tech, Inc.) under conditions of a rotation speed of 31 rpm and an inflow current of −10 μmA. The measured surface potential was taken to be a charge potential ($V_0$). The measurement was performed under ambient conditions of 23° C. and 50% relative humidity.

(Measurement of Post-Irradiation Potential $V_L$)

With respect to each of the photosensitive members (A-1) to (A-19) and (B-1), the photosensitive member was charged to −600 V at a rotation speed of 31 rpm using a drum sensitivity test device (product of Gen-Tech, Inc.). Next, a band pass filter was used to obtain monochromatic light (wavelength: 780 nm, light intensity 0.8 μJ/cm$^2$) from light emitted by a halogen lamp, and the surface of the photosensitive member was irradiated with the monochromatic light. The surface potential of the photosensitive member was measured 80 milliseconds after completion of irradiation with the monochromatic light. The measured surface potential was taken to be a post-irradiation potential ($V_L$). The measurement was performed under ambient conditions of 23° C. and 50% relative humidity.

(Evaluation of Photosensitive Member Abrasion Resistance)

With respect to each of the photosensitive members (A-1) to (A-19) and (B-1), the application liquid for charge transport layer formation prepared in the production of the photosensitive member was applied onto a polypropylene sheet (thickness 0.3 mm) wound around an aluminum pipe (diameter: 78 mm). The application liquid for charge transport layer formation on the polypropylene sheet was dried at 120° C. for 40 minutes to give an abrasion evaluation test sheet with a charge transport layer having a film thickness of 30 μm.

A sample was prepared by removing the charge transport layer from the polypropylene sheet and mounting the charge transport layer on a specimen mounting card S-36 (product of TABER Industries). A 1,000 rotation abrasion test was performed on the prepared sample by a rotary abrasion tester (product of Toyo Seiki Co., Ltd.) using a wear ring CS-10 (product of TABER Industries) under conditions of a 500 gf load and a rotation speed of 60 rpm. An abrasion loss (mg/1,000 rotations), which is a difference in mass of the sample before and after the abrasion test, was measured. Abrasion resistance of the photosensitive member was evaluated based on the thus obtained abrasion loss.

Table 1 shows components and results of the evaluation of properties of the photosensitive members (A-1) to (A-19) and (B-1). In the "Hole transport material" column in Table 1, HTM-1 to HTM-10 respectively represent the hole transport materials (HTM-1) to (HTM-10). The molecular weight in the "Binder resin" column represents viscosity average molecular weight. The types Resin-1 to Resin-11 in the "Binder resin" column respectively represent the polyarylate resins (Resin-1) to (Resin-11).

TABLE 1

| | Photosensitive member | Charge transport layer | | | Electrical properties | | Abrasion resistance Abrasion loss |
|---|---|---|---|---|---|---|---|
| | | Hole transport material | Binder resin | | $V_0$ (V) | $V_L$ (V) | (mg/1000 rotations) |
| | | | Type | Molecular weight | | | |
| Example 1 | A-1 | HTM-1 | Resin-1 | 49,200 | −680 | −55 | 3.5 |
| Example 2 | A-2 | HTM-2 | Resin-1 | 49,200 | −681 | −55 | 3.6 |
| Example 3 | A-3 | HTM-3 | Resin-1 | 49,200 | −674 | −53 | 3.8 |
| Example 4 | A-4 | HTM-4 | Resin-1 | 49,200 | −684 | −56 | 3.9 |
| Example 5 | A-5 | HTM-5 | Resin-1 | 49,200 | −874 | −34 | 3.9 |
| Example 6 | A-6 | HTM-6 | Resin-1 | 49,200 | −684 | −45 | 3.5 |
| Example 7 | A-7 | HTM-7 | Resin-1 | 49,200 | −875 | −55 | 3.6 |
| Example 8 | A-8 | HTM-8 | Resin-1 | 49,200 | −869 | −92 | 3.8 |
| Example 9 | A-9 | HTM-9 | Resin-1 | 49,200 | −698 | −99 | 3.7 |
| Example 10 | A-10 | HTM-1 | Resin-2 | 50,500 | −674 | −53 | 3.5 |
| Example 11 | A-11 | HTM-1 | Resin-3 | 53,000 | −675 | −56 | 4.3 |
| Example 12 | A-12 | HTM-1 | Resin-4 | 47,500 | −689 | −56 | 5.0 |
| Example 13 | A-13 | HTM-1 | Resin-5 | 50,300 | −670 | −56 | 3.5 |
| Example 14 | A-14 | HTM-1 | Resin-6 | 51,600 | −681 | −53 | 3.6 |
| Example 15 | A-15 | HTM-1 | Resin-7 | 45,400 | −689 | −55 | 5.5 |
| Example 16 | A-16 | HTM-1 | Resin-8 | 50,200 | −670 | −50 | 4.5 |
| Example 17 | A-17 | HTM-1 | Resin-9 | 51,000 | −688 | −60 | 4.5 |
| Example 18 | A-18 | HTM-1 | Resin-10 | 50,100 | −680 | −58 | 3.3 |
| Example 19 | A-19 | HTM-10 | Resin-1 | 49,200 | −687 | −101 | 4.0 |
| Comparative Example 1 | B-1 | HTM-1 | Resin-11 | 49,800 | −690 | −54 | 8.2 |

As shown in Table 1, the photosensitive layer of each of the photosensitive members (A-1) to (A-19) contained a charge generating material, a hole transport material, and a binder resin. The binder resin included any one of the polyarylate resins (Resin-1) to (Resin-10). The polyarylate resins (Resin-1) to (Resin-10) were those encompassed by the polyarylate resin represented by general formula (1). As shown in Table 1, the photosensitive members (A-1) to (A-19) each resulted in an abrasion loss in a range of from 3.5 mg to 5.5 mg.

As shown in Table 1, the photosensitive member (B-1) contained a binder resin including the polyarylate resin (Resin-11). The polyarylate resin (Resin-11) was not a polyarylate resin encompassed by the polyarylate resin represented by general formula (1). As shown in Table 1, the photosensitive member (B-1) resulted in an abrasion loss of 8.2 mg.

As apparent from Table 1, the photosensitive members according to the second embodiment (the photosensitive members (A-1) to (A-19)) each resulted in a small abrasion loss in the abrasion resistance evaluation compared to the photosensitive member (B-1). It is therefore apparent that when contained in a photosensitive member, the polyarylate resin according to the present disclosure improves abrasion resistance of the photosensitive member, and the photosensitive member according to the present disclosure has excellent abrasion resistance.

As shown in Table 1, the photosensitive layers of the photosensitive members (A-1), (A-10), and (A-13) respectively contained the polyarylate resins (Resin-1), (Resin-2), and (Resin-5) as binder resins. These polyarylate resins were polyarylate resins that are each represented by general formula (1) in which X or Y represents a divalent group represented by general formula (1-4). The photosensitive members (A-1), (A-10), and (A-13) each resulted in an abrasion loss of 3.5 mg.

As shown in Table 1, the photosensitive layers of the photosensitive members (A-11), (A-12), and (A-14) respectively contained the polyarylate resins (Resin-3), (Resin-4), and (Resin-6) as binder resins. These polyarylate resins were not polyarylate resins that are each represented by general formula (1) in which X or Y represents a divalent group represented by general formula (1-4). The photosensitive members (A-11), (A-12), and (A-14) each resulted in an abrasion loss in a range of from 3.6 mg to 5.0 mg.

As apparent from Table 1, the photosensitive members (A-1), (A-10), and (A-13) each resulted in a small abrasion loss compared to the photosensitive members (A-11), (A-12), and (A-14). It is apparent that when a photosensitive layer of a photosensitive member contains the polyarylate resin represented by general formula (1) in which X or Y represents a divalent group represented by general formula (1-4), the photosensitive member has improved abrasion resistance compared to a photosensitive member containing a different polyarylate resin.

What is claimed is:

1. An electrophotographic photosensitive member comprising a conductive substrate and a photosensitive layer, wherein
the photosensitive layer contains a charge generating material, a hole transport material, and a binder resin,
the hole transport material is represented by chemical formula (HTM-1) or (HTM-6) shown below, and
the binder resin includes a polyarylate resin represented by chemical formula (Resin-1) or (Resin-5) shown below:

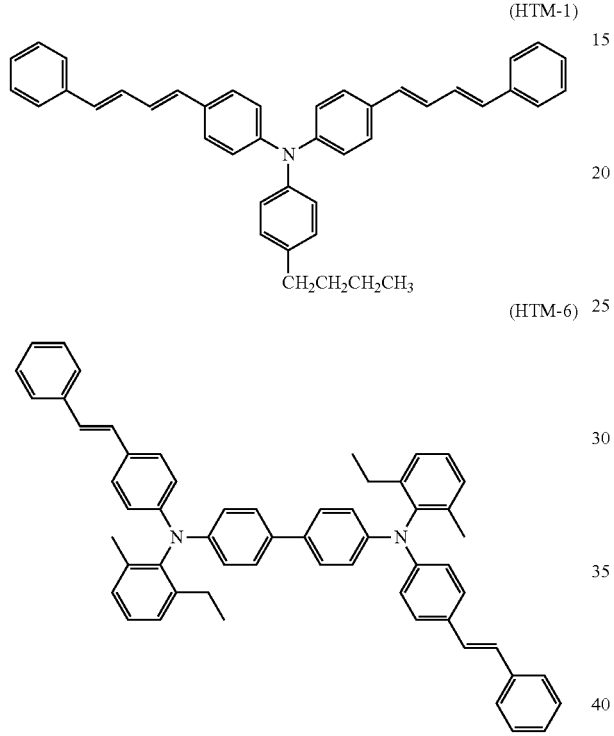

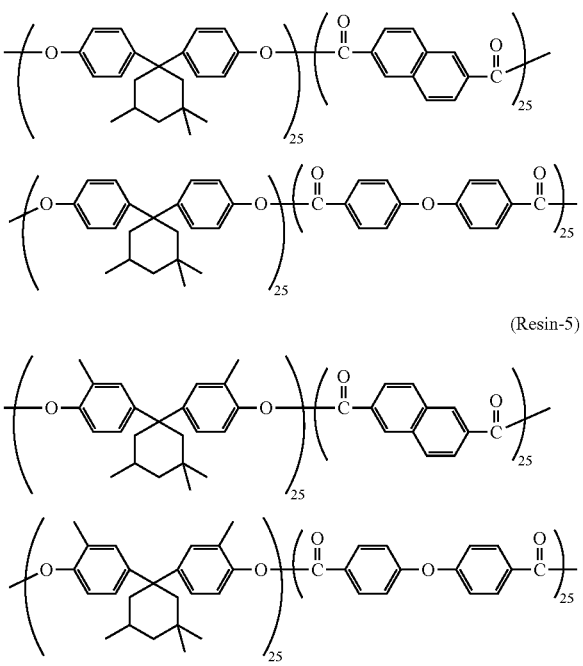

2. The electrophotographic photosensitive member according to claim 1, wherein
the photosensitive layer includes:
a charge generating layer containing the charge generating material; and
a charge transport layer containing the hole transport material and the binder resin, and
the charge transport layer is a one-layer charge transport layer disposed as an outermost layer.

* * * * *